(12) United States Patent
Hamada et al.

(10) Patent No.: US 8,134,661 B2
(45) Date of Patent: Mar. 13, 2012

(54) REFLECTION-TYPE LIQUID CRYSTAL DISPLAY DEVICE

(75) Inventors: Tetsuya Hamada, Kawasaki (JP); Kunihiro Tashiro, Kawasaki (JP); Mari Sugawara, Kawasaki (JP); Toshihiro Suzuki, Kawasaki (JP); Hidefumi Yoshida, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/081,576

(22) Filed: Apr. 7, 2011

(65) Prior Publication Data

US 2011/0181815 A1  Jul. 28, 2011

Related U.S. Application Data

(62) Division of application No. 11/983,869, filed on Nov. 13, 2007, which is a division of application No. 10/810,483, filed on Mar. 26, 2004, now Pat. No. 7,359,011.

(30) Foreign Application Priority Data

Mar. 31, 2003 (JP) .................................. 2003-095011

(51) Int. Cl.
*G02F 1/1335* (2006.01)

(52) U.S. Cl. .............................. 349/112; 349/63; 349/64

(58) Field of Classification Search .................... 349/63, 349/64, 112; 362/606, 607
See application file for complete search history.

(56) References Cited

U.S. PATENT DOCUMENTS

| | | | |
|---|---|---|---|
| 5,245,456 | A | 9/1993 | Yoshimi et al. |
| 6,108,059 | A | 8/2000 | Yang |
| 6,196,692 | B1 | 3/2001 | Umemoto et al. |
| 6,266,108 | B1 | 7/2001 | Bao et al. |
| 6,340,999 | B1 | 1/2002 | Masuda et al. |
| 6,392,727 | B1 | 5/2002 | Larson et al. |
| 6,507,378 | B1 | 1/2003 | Yano et al. |
| 6,734,934 | B2 | 5/2004 | Yoshii et al. |
| 6,742,921 | B2 | 6/2004 | Umemoto et al. |
| 6,866,393 | B2 | 3/2005 | Yano et al. |
| 6,933,991 | B2 | 8/2005 | Sanelle et al. |
| 7,012,663 | B2 | 3/2006 | Ono et al. |
| 7,030,944 | B2 | 4/2006 | Fujimoto |
| 2001/0046134 | A1 | 11/2001 | Masaki et al. |
| 2002/0015123 | A1 | 2/2002 | Iwata et al. |

FOREIGN PATENT DOCUMENTS

| | | |
|---|---|---|
| JP | 11-259007 | 9/1999 |
| JP | 11-344707 | 12/1999 |
| JP | 2000-131667 | 5/2000 |
| JP | 2000-155315 | 6/2000 |
| JP | 2001-108986 | 4/2001 |
| JP | 2002-006143 | 1/2002 |
| JP | 2003-66236 | 3/2003 |

*Primary Examiner* — Richard Kim

(74) *Attorney, Agent, or Firm* — Greer, Burns & Crain, Ltd.

(57) ABSTRACT

To suppress a decrease in the contrast caused by the reflection on the interface to the air layer without decreasing the quality of display. A reflection-type liquid crystal display device includes a light guide plate having a polarizing element stuck or adhered thereto on the side facing a reflection-type liquid crystal display panel and arranged maintaining a predetermined gap relative to the reflection-type liquid crystal display panel. The display device further includes a source of light arranged on an end surface side of the light guide plate, and a member having a light-diffusing function and interposed between the polarizing element and the light guide plate.

6 Claims, 14 Drawing Sheets

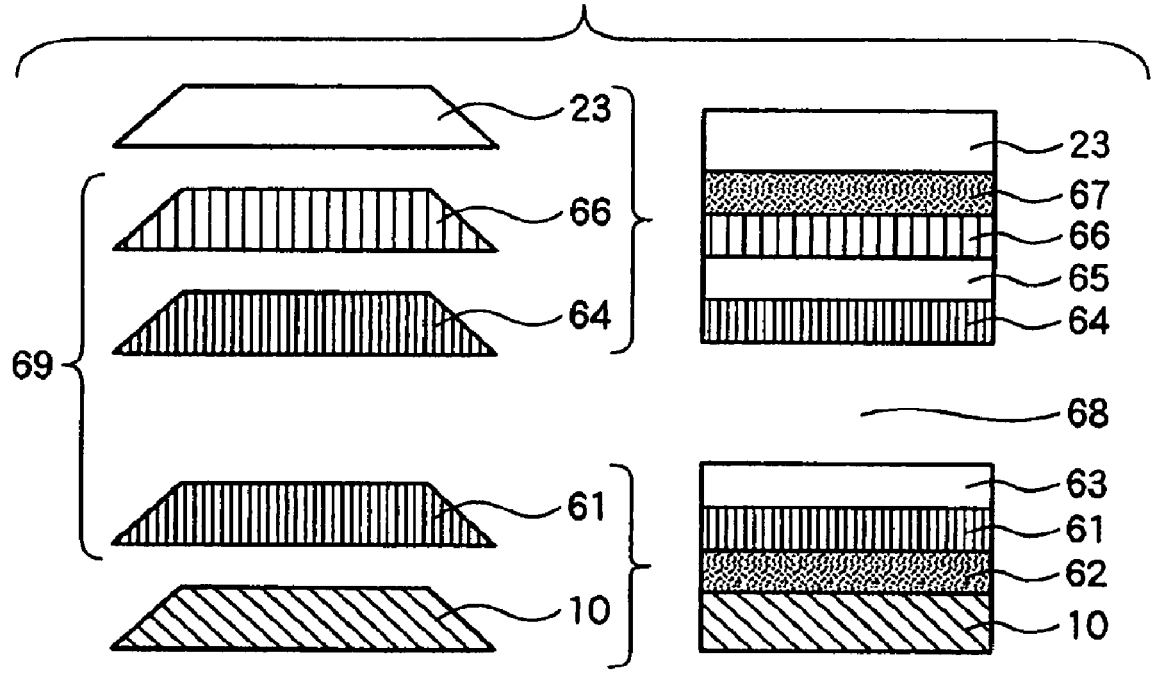

|  | EXAMPLE 1 | EXAMPLE 2 |
|---|---|---|
| FIRST PHASE DIFFERENCE PLATE | A | λ/4 PLATE |
| SECOND PHASE DIFFERENCE PLATE | λ/4 PLATE ± A | λ/2 PLATE |
| THIRD PHASE DIFFERENCE PLATE | λ/2 PLATE | λ/2 PLATE |
| FUNCTION | WIDE/BAND λ/4 PLATE | WIDE-BAND λ/4 PLATE + OPTICAL COMPENSATION PLATE |

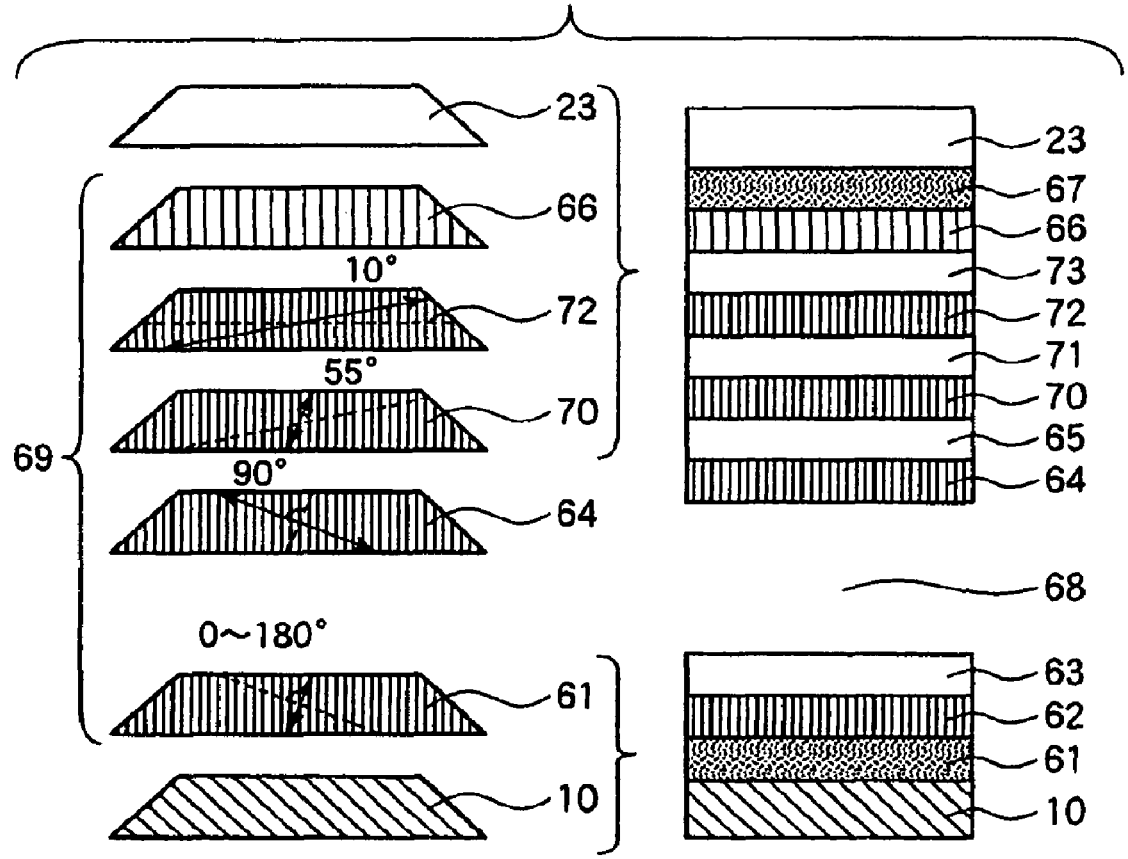

| STICKING LAYER WITH LIGHT DIFFUSER | HAZE VALUE | RING MOIRE | INTERFERENCE FRINGES | REMARKS |
|---|---|---|---|---|
| BETWEEN POLARIZING PLATE AND LIGHT GUIDE PLATE | 20 | × | × | |
| | 40 | △ | × | |
| | 60 | ○ | △ | BLURR, LOW CR |
| BETWEEN FIRST PHASE DIFFERENCE PLATE AND LIQUID CRYSTAL PANEL | 20 | × | △ | |
| | 40 | × | ○ | |
| | 60 | △ | ○ | LOW CR |
| NONE | — | × | × | |
| AG TREATMENT ALONE | 20 | × | △ | SURFACE SCARRED |

FIG.18A         FIG.18B         FIG.18C
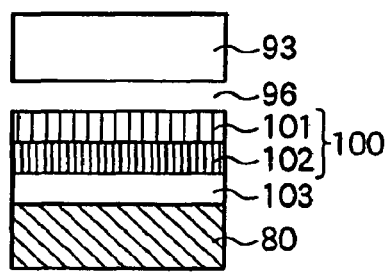
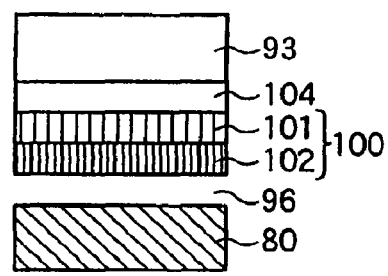
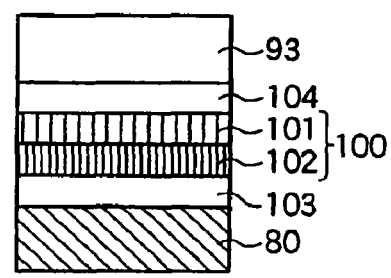
FIG.19
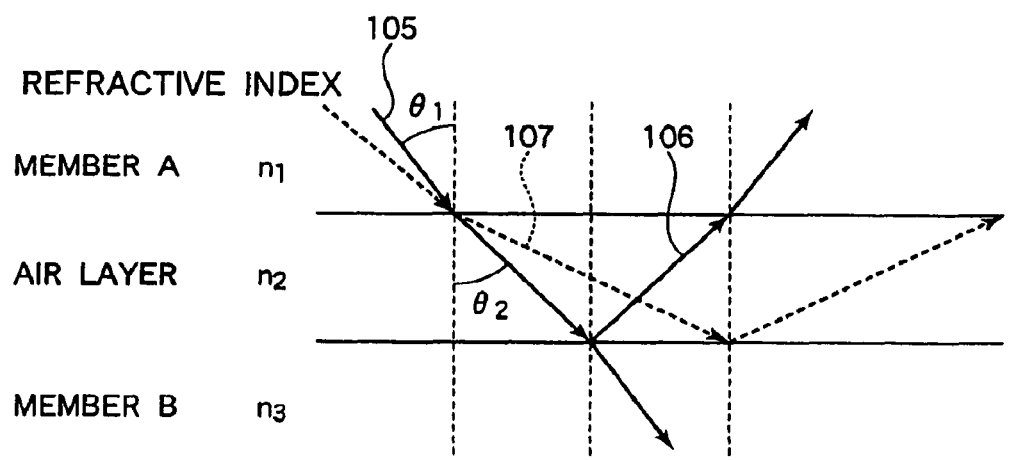

REFLECTION-TYPE LIQUID CRYSTAL DISPLAY DEVICE

This is a divisional of application Ser. No. 11/983,869, filed Nov. 13, 2007, which is a divisional of application Ser. No. 10/810,483, filed Mar. 26, 2004, now U.S. Pat. No. 7,359,011 issued Apr. 15, 2008.

BACKGROUND OF THE INVENTION

1. Field of the Invention

This invention relates to a reflection-type liquid crystal display device and, particularly, to a reflection-type liquid crystal display device used for low-power-consumption units such as portable terminals and having a feature in the constitution for suppressing a decrease in the contrast caused by the reflection on the interface without decreasing the quality of display.

2. Description of the Related Art

Owing to their features such as small in size, light in weight and low power consumption, the liquid crystal display devices have been widely used as data equipment terminals, TVs, portable data equipment terminals, display monitors such as video cameras, etc.

The liquid crystal material does not emit the light by itself and a source of light is necessary when it is used as a display device. In the case of a reflection-type liquid crystal display device used as a low-power-consumption unit such as a portable terminal, in particular, the indoor illumination serves as a source of light or a front light unit is used as a source of light (see, for example, JP-A-2001-108986).

Here, a conventional reflection-type liquid crystal display device will be described with reference to FIG. 17.

FIG. 17 is a sectional view schematically illustrating a conventional reflection-type liquid crystal display device comprising a front light unit 90 and a liquid crystal display panel 80 constituted by a liquid crystal layer 82 held between a TFT substrate 81 and a CF (color filter) substrate 83, which are firmly held face to face by a frame 85 maintaining a small gap or an air layer 96.

The front light unit 90 includes a source 91 of light, a light guide plate 93 and a reflector 92 for reflecting and collecting light from the source 91 of light toward the light guide plate 93. A prism 94 is engraved in the surface of the light guide plate 93, i.e., on the side of the viewer, and light being guided is partly reflected toward the liquid crystal display panel 80.

Usually, further, a reflection prevention film 95 is provided on the back surface of the front light unit 90 and a polarizing plate 84 is provided on the front surface side of the liquid crystal display panel 80.

The pitch of the prism 94 is so set relative to the pixel pitch of the liquid crystal display panel 80 that moiré fringes appear little.

For example, the prism pitch is set to be equal to the pixel pitch so that the moiré pitch becomes an infinity or is so set that the moiré pitch becomes very fine.

In general, further, the liquid crystal display panel 80 is so constructed as to elevate the reflection factor in order to realize bright display. In the use of small devices such as cell phones and PDAs, in particular, the designing aims at accomplishing a very high reflection factor since the viewing angle need not be broad.

In this reflection-type liquid crystal display device, a circularly polarizing plate is usually used, the circularly polarizing plate being made up of a retardation plate and a polarizing plate. When no retardation is occurred in the liquid crystal display panel or when light is reflected in front of the liquid crystal display panel, however, the reflected light is absorbed by the circularly polarizing plate and does not go out.

This is because the circularly polarizing plate converts, first, the incident light into linearly polarized light through the polarizing plate and converts, next, the light into circularly polarized light through the retardation plate. The circularly polarized light reflected by the interface falls again on the retardation plate and is converted into linearly polarized light with its direction of polarization being turned by 90 degrees. The reflected light which is the linearly polarized light turned by 90 degrees is absorbed by the polarizing plate and does not go out.

The structure for arranging the circularly polarizing plate can be contrived in the following three types as illustrated in FIG. 18.

FIG. 18A is a view schematically illustrating the constitution of when the circularly polarizing plate is stuck to the side of the liquid crystal display panel, in which the circularly polarizing plate 100 comprising a polarizing plate 101 and a retardation plate 102 is stuck onto the display surface of the liquid crystal display panel 80 by using a sticking agent 103, and an air layer 96 exists relative to the light guide plate 93.

FIG. 18B is a view schematically illustrating the constitution of when the circularly polarizing plate is stuck to the side of the light guide plate, in which the circularly polarizing plate 100 comprising the polarizing plate 101 and the retardation plate 102 is stuck onto the back surface of the light guide plate 93 by using the sticking agent 104, and the air layer 96 exists relative to the liquid crystal display panel 80.

FIG. 18C is a view schematically illustrating the constitution of when both surfaces of the circularly polarizing plate are stuck, in which the circularly polarizing plate 100 comprising the polarizing plate 101 and the retardation plate 102 is stuck onto the back surface of the light guide plate 93 and to the liquid crystal display panel 80 by using the sticking agents 103 and 104. In this case, there exists no air layer.

FIG. 19 is a diagram illustrating the reflected light components on the interfaces to the air layer.

The air layer 96 in the above constitution has a refractive index $n_2=1$, and constituent members such as the liquid crystal display panel 80, circular polarizing plate 100, light guide plate 93 and sticking agents 103, 104 have refractive indexes $n_1$ and $n_3$ of about 1.4 to about 1.6. Therefore, the greatest difference in the refractive index exists on the interfaces among the constituent members and the air layer 96, and the incident light 105 is greatly refracted by the interfaces.

The reflection increases on the interface as the refraction increases. As the refraction exceeds a critical angle, further, a total reflection takes place and the contrast decreases.

In the constitution illustrated in, for example, FIG. 18A, the contrast is only about 5 to about 10. The low contrast narrows the range of reproducing colors, and the quality of display is very poor.

In principle, therefore, the constitution of FIG. 18C is desired. However, when the light guide plate 93 and the liquid crystal display panel 80 having different coefficients of thermal expansion are stuck together, there occurs peeling due to thermal shock. Or, when the rigid bodies are stuck together, air bubbles tend to infiltrate. Therefore, the use of this constitution involves difficulty except the small devices.

It has therefore been proposed to use the constitution of FIG. 18B in which the circularly polarizing plate 100 is stuck to the light guide plate 93, enabling the light 106 reflected by the interface to the air layer 96 to be absorbed by the polarizing plate 101 that constitutes the circularly polarizing plate 100 to thereby enhance the contrast (see, for example, JP-A-11-259007).

However, the above constitution of FIG. 18B is accompanied by a problem of conspicuous interference rainbow due to moiré fringes between the prism 94 of the light guide plate 93 and the pixels of the liquid crystal display panel 80, and due to interference between the reflection structure of the liquid crystal display panel 80 and the pixels.

The cause is attributed to a decrease in the diffusing light component stemming from a decrease in the angle of light guided through the light guide plate 93 as a result of sticking the circular polarizing plate 100 onto the light guide plate 93.

When the diffusing light component is strong, on the other hand, the moiré fringes and interference fringes are averaged and are weakened.

There still remains a problem of a decrease in the contrast since light 107 refracted in excess of a critical angle by the interface to the air layer 96 is totally reflected.

There further exists a problem in that the circularly polarizing plate 100 and the liquid crystal display panel 80 are abraded by the external pressure of input using a pen, and the circularly polarizing plate 100 is scarred.

SUMMARY OF THE INVENTION

It is therefore an object of this invention to suppress a decrease in the contrast caused by the reflection by the interfaces to the air layer without decreasing the quality of display.

FIG. 1 is a view of constitution illustrating a principle of the invention. Means for solving the problem of the invention will now be described with reference to FIG. 1.

To solve the above problem, the invention provides a reflection-type liquid crystal display device comprising:

a light guide plate 2 having a polarizing element 4 stuck or adhered thereto on the side facing a reflection-type liquid crystal display panel 1;

a source 3 of light arranged on an end surface side of the light guide plate 2; and the reflection-type liquid crystal display panel 1 arranged maintaining a predetermined gap relative to the light guide plate 2; wherein a light-diffusing function is imparted to the surface of the reflection-type liquid crystal display panel 1 on the side facing the light guide plate 2.

Thus, the light-diffusing function is imparted to the surface of the reflection-type liquid crystal display panel 1 on the side facing the light guide plate 2. Therefore, light incident on the reflection-type liquid crystal display panel 1 may generate interference rainbow due to the interference between the reflection surface in the liquid crystal display panel 1 and the pixel unit. However, a diffusion member or a ruggedness in the surface of the reflection-type liquid crystal display panel 1 diffuses the interference rainbow. Therefore, the interference rainbow is weakened before it is seen by the viewer.

Here, the word "stick" means the sticking by using a sheet-like sticking layer and the word "adhesion" means the adhesion by using a gel-like adhering member such as an adhesive.

To impart the light-diffusing function, in this case, the surface of the reflection-type liquid crystal display panel 1 may be roughened as designated at 5, or the surface of the reflection-type liquid crystal display panel 1 may be stuck with a film having a light-diffusing function comprising, for example, a sticking layer containing a light-diffusing material and a triacetyl cellulose (TAC) film.

It is desired that the film having the light-diffusing function is subjected to the reflection-preventing treatment on the side of the interface to the air layer.

Or, a member having a light-diffusing function may be interposed between the polarizing element 4 and the light guide plate 2. In this case, the light-diffusing material may be contained in at least one of a plurality of sticking layers constituting the polarizing element 4 and, particularly, in a sticking layer on the side close to the light guide plate 2 and, most preferably, in the sticking layer that comes in contact with the light guide plate 2.

Or, the outer surface of the polarizing element 4 stuck or adhered to the light guide plate 2 may be roughened.

In this case, light from the source 3 of light is reflected and collected by the reflector 6 and is guided to the light guide plate 2. Here, light reflected by the prism surfaces on the surface of the light guide plate 2 goes out of the light guiding conditions and goes out of the light guide plate 2 to form a ray A of light heading toward the panel surface on the back surface side of the light guide plate 2. The ray A of light is reflected by the back surface of the light guide plate 2, and light A' reflected by the surface passes through the surface of the light guide plate 2 and enters as a ray C of light to the viewer's eyes. Here, however, the light reflected by the surface becomes diffused light B since the diffusing material or ruggedness is formed on the back surface of the light guide plate 2.

When the ray A' of light having a pattern of the prism pitch is converted into a ray B of light, the pattern of the prism pitch is maintained but the conversion is in a direction in which the distribution of light is uniformed. Therefore, the ray C of light contains moiré fringes due to the ray B of light and the prism of the light guide plate 2, and the intensity of moiré fringes is small.

In this case, too, it is desired that the polarizing element 4 is subjected to the reflection-prevention treatment on the side of the interface to the air layer.

The light-diffusing function may be provided on both the side of the light conductor plate 2 and the side of the reflection-type liquid crystal display panel 1.

The invention is further concerned with a reflection-type liquid crystal display panel 1 wherein at least the reflection-type liquid crystal display panel 1, a first retardation plate, a second retardation plate, a polarizing plate and a light guide plate 2 are laminated in this order, the first retardation plate is stuck or adhered to the reflection-type liquid crystal display panel 1, the second retardation plate and the polarizing plate are stuck or adhered to the light guide plate 2, and a circular polarizer is constituted by the first retardation plate, second retardation plate and polarizing plate.

In this case, the first retardation plate is stuck to the reflection-type liquid crystal display panel 1 to prevent the reflection, to prevent the scars and to impart the diffusing function. Further, the second retardation plate and the polarizing plate are stuck to the light guide plate 2 to bring the light going out from the second retardation plate close to the circularly polarized light, so that the reflection by the interface to the air layer is absorbed as much as possible by the polarizing plate, or wavelength dispersion in the in-plane retardation is decreased so that light reflected by the reflection-type liquid crystal display panel 1 is efficiently absorbed by the polarizing plate.

Further, the circular polarizer is constituted by the first retardation plate, second retardation plate and polarizing plate to bring the total in-plane retardation of the first retardation plate and of the second retardation plate to be a desired retardation, i.e., to be not smaller than 95 nm but not larger than 195 nm, which is one-fourth the range of visible light wavelengths, to render the light going out from the first retardation plate to be a circularly polarized light, so that the light reflected by the reflection-type liquid crystal display panel 1 is efficiently absorbed by the polarizing plate.

The circular polarizer stands for an element that converts the polarized state of the incident light into nearly a circular polarization. Even when the polarized state of light going out is deviated from the circular polarization, the device can be regarded to be the circular polarizer if the light emitted to the viewer is turned by about 90 degrees and is linearly polarized in relation to the reflection-type liquid crystal display panel 1.

The above constitution makes it possible to decrease the intensity of reflection of black display and to enhance the contrast.

That is, the light going out from the first retardation plate constituting the interface to the air layer is deviated from the circularly polarized light. When the reflection by the interface is compared with the light reflected by the reflection-type liquid crystal display panel 1, however, the latter one has a large intensity of reflection, and the contrast can be enhanced when the light going out from the second retardation plate is circularly polarized.

In this case, in constituting a λ/4 plate by selecting the sum of in-plane retardations of the first retardation plate and of the second retardation plate to be not smaller than 95 nm but not larger than 195 nm, which is one-fourth the region of visible light wavelengths, it is desired that the angle subtended by the delay phase axes of the first retardation plate and of the second retardation plate is selected to be not smaller than 0 degree but not larger than 30 degrees.

Desirably, in this case, the in-plane retardation of the first retardation plate is decreased as small as possible to bring the in-plane retardation of the second retardation plate close to one-fourth the region of the visible light wavelengths.

If the delay phase axes of the first retardation plate and of the second retardation plate are nearly in parallel with each other, the in-plane retardations thereof may be added up to constitute the circular polarizer. If the retardation remains in the direction of thickness, the light deviates from the circular polarization. The deviation, however, can be corrected by selecting the angle subtended by the delay phase axes to be not smaller than 0 degree but not larger than 30 degrees.

Relying upon this constitution, the light going out from the second retardation plate is circularly polarized or the light emitted to the viewer is turned by about 90 degrees so as to be linearly polarized in relation to the reflection-type crystal panel 1, to thereby enhance the contrast.

When the retardation remains in the direction of thickness, the light is deviated from the linearly deviated light that is turned by 90 degrees. When the device is so constituted as to decrease the intensity of reflection, however, the action is the same and the device can be regarded to be the circular polarizer.

Or, in constituting a λ/4 plate by selecting the difference of in-plane retardations between the first retardation plate and the second retardation plate to be not smaller than 95 nm but not larger than 195 nm, which is one-fourth the region of visible light wavelengths, it is desired that the angle subtended by delay phase axes of the first retardation plate and of the second retardation plate is selected to be not smaller than 60 degree but not larger than 90 degrees.

When the delay phase axes of the first retardation plate and of the second retardation plate are nearly at right angles, the respective in-plane retardations may be subtracted to constitute the circular polarizer. When the retardation remains in the direction of thickness, however, the light deviates from the circular polarization. The deviation, however, can be corrected by deviating the delay phase axes by about 30 degrees from the state of right angles, i.e, by selecting the angle subtended by the delay phase axes to be not smaller than 60 degrees but not larger than 90 degrees.

With this constitution, too, the light going out from the second retardation plate can be circularly polarized or the light emitted to the viewer can be turned by about 90 degrees so as to be linearly polarized in relation to the reflection-type liquid crystal display panel 1 to thereby enhance the contrast.

In this case, too, when the retardation remains in the direction of thickness, the light is deviated from the linearly deviated light that is turned by 90 degrees. When the device is so constituted as to decrease the intensity of reflection, however, the action is the same and the device can be regarded to be the circular polarizer.

In the above constitutions, it is desired the angle subtended by the absorption axis of the polarizer plate and by the delay phase axis of the second retardation plate is θ and that the angle subtended by the absorption axis of the polarizer plate and by the delay phase axis of the first retardation plate is about 2θ+45 degrees.

Relying upon the above constitution, a wide-band λ/4 plate can be constituted by using the second retardation plate as the λ/2 plate and the first retardation plate as the λ/4 plate.

That is, by selecting the angle subtended by the absorption axis of the polarizing plate and by the delay phase axis of the first retardation plate to be about 2θ+45 degrees, the λ/2 plate works to turn the direction of linear polarization symmetrically to the delay phase axis irrespective of the direction of the delay phase axis, and the λ/4 plate works to circularly polarize the linearly polarized light that is incident from a direction of roughly 45 degrees or 135 degrees relative to the delay axis.

Owing to this constitution, the wavelength dispersion in the in-plane retardation is decreased, and the light reflected by the reflection-type liquid crystal display panel 1 is efficiently absorbed by the polarizing plate.

In this constitution, the reflection by the interface to the air layer cannot be suppressed. When the reflection by the interface is compared with the light reflected by the reflection-type liquid crystal display panel 1, however, the latter one has a large strength of reflection and the contrast can be enhanced.

In the above constitution, further, it is desired to arrange a third retardation plate having an in-plane retardation of not smaller than 190 nm but not larger than 390 nm which is one-half the region of visible light wavelengths between the polarizing plate and the second retardation plate.

Owing to the above constitution, it is allowed to constitute a wide-band λ/4 plate or a wide-band λ/4 plate and an optical compensation plate by using the first to third retardation plates decreasing the wavelength dispersion in the in-plane retardation enabling the light reflected by the reflection-type liquid crystal display panel 1 to be efficiently absorbed by the polarizing plate.

If the in-plate retardation of the first retardation plate is decreased as small as possible, the light going out from the second retardation plate can be brought close to the circularly polarized light, and a large proportion of light reflected by the interface to the air layer can be absorbed by the polarizing plate enabling the contrast to be further enhanced.

Here, the optical compensation is to cancel a positive retardation that generates in the direction of thickness of the reflection-type liquid crystal display panel 1 relying upon a negative retardation that generates in the direction of thickness of the retardation plate.

In this case, it is desired that the angle subtended by the absorption axis of the polarizing plate and by the delay phase axis of the third retardation plate is θ, the angle subtended by the absorption axis of the polarizing plate and by the delay phase axis of the second retardation plate is roughly 2θ+45 degrees, and the difference in the in-plane retardation between the third retardation plate and the first and the second retardation plates is not smaller than 95 nm but is not larger than 195 nm, which is one-fourth the region of visible light wavelengths.

Owing to this constitution, the λ/2 plate is constituted by the third retardation plate, the λ/4 plate is constituted by the first and the second retardation plates, and the wide-band λ/4 plate is constituted by the first to third retardation plates.

Here, desirably, the in-plane retardation of the first retardation plate is decreased as small as possible to bring the in-plane retardation of the second retardation plate close to one-fourth the region of visible light wavelengths.

Or, it is desired that the angle subtended by the absorption axis of the polarizing plate and by the delay phase axis of the third retardation plate is θ, the angle subtended by the absorption axis of the polarizing plate and by the delay phase axis of the second retardation plate is roughly 2θ+45 degrees, the delay phase axis of the second retardation plate and delay phase axis of the first retardation plate are nearly at right angles with each other, and the difference in the in-plane retardation between the second retardation plate and the first retardation plate is not smaller than 95 nm but is not larger than 195 nm, which is one-fourth the region of visible light wavelengths.

Owing to this constitution, the λ/2 plate is constituted by the second and the third retardation plates, the λ/4 plate is constituted by the first retardation plate, and the wide-band λ/4 plate is combined with the optical compensation plate.

Namely, the second retardation plate is equivalent to two pieces of λ/4 plates having the same delay phase axis, the wide-band λ/4 plate is constituted by the third retardation plate and by the one λ/4 plate, and the optical compensation plate is constituted by the first retardation plate and by the other λ/4 plate.

As a result, the wavelength dispersion in the in-plane retardation is decreased, the light reflected by the reflection-type liquid crystal display panel 1 is efficiently absorbed by the polarizing plate, and the retardation is cancelled in the direction of thickness of the liquid crystal layer that is vertically aligned. This will now be described.

In the vertically aligned mode using the circularly polarizing plate, the display is black when no voltage is applied or the applied voltage is smaller than a threshold value. Therefore, the in-plane retardation becomes roughly zero, and the contrast can, in principle, be enhanced. In the horizontally aligned mode using the circularly polarizing plate, on the other hand, the display is black when a voltage is applied. Therefore, the in-plane retardation becomes a minimum which, however, is not zero, and the contrast becomes relatively low.

This is because in the horizontally aligned mode, a strong anchoring effect is produced by the alignment film, and the liquid crystal layer is not raised on the interface of the substrate even after the voltage is applied.

Even in the vertically aligned mode, the retardation generates in the direction of thickness for the incident light that is tilted. However, the in-plane retardations are cancelled by each other if there is arranged an optical compensation plate which is equivalent to the constitution in which two pieces of λ/4 plates are so arranged that the delay phase axes thereof are at right angles. Therefore, the retardation in the direction of thickness can be used for optically compensating the reflection-type liquid crystal display panel 1.

By combining the wide-band λ/4 plate and the optical compensation plate together as described above, the light emitted to the viewer is turned by about 90 degrees and is linearly polarized in relation to the reflection-type liquid crystal display panel 1, which, therefore, can be regarded as a circular polarizer as a whole.

This constitution is not capable of suppressing the reflection by the interface to the air layer. When the reflection by the interface is compared with the light reflected by the reflection-type liquid crystal display panel 1, however, the latter one has a large intensity of reflection, and a high contrast is maintained.

In the above constitution, further, it is desired to arrange the third retardation plate and a fourth retardation plate having an in-plane retardation of not smaller than 190 nm but not larger than 390 nm, which is one-half the region of visible light wavelengths, between the polarizing plate and the second retardation plate. Then, the wide-band λ/4 plate and the optical compensation plate are constituted by the first to the fourth retardation plates.

Owing to this constitution, the wavelength dispersion in the in-plane retardation is decreased, the light reflected by the reflection-type liquid crystal display panel 1 is efficiently absorbed by the polarizing plate, and the retardation is cancelled in the direction of thickness of the liquid crystal layer that is vertically aligned.

If the in-plate retardation of the first retardation plate is decreased as small as possible, the light going out from the second retardation plate can be brought close to the circularly polarized light, and a large proportion of light reflected by the interface to the air layer can be absorbed by the polarizing plate to maintain the highest contrast.

In this case, it is desired that the angle subtended by the absorption axis of the polarizing plate and by the delay phase axis of the fourth retardation plate is θ, the angle subtended by the absorption axis of the polarizing plate and by the delay phase axis of the third retardation plate is roughly 2θ+45 degrees, the delay phase axis of the third retardation plate and the delay phase axis of the second retardation plate are nearly at right angles, and the difference in the in-plane retardation between the third retardation plate and the first and the second retardation plates is not smaller than 95 nm but is not larger than 195 nm, which is one-fourth the region of visible light wavelengths.

Owing to this constitution, the λ/2 plate is constituted by the third and fourth retardation plates, the λ/4 plate is constituted by the first and the second retardation plates, and the wide-band λ/4 plate is combined with the optical compensation plate.

Here, desirably, the in-plane retardation of the first retardation plate is decreased as small as possible to bring the in-plane retardation of the second retardation plate close to one-fourth the region of visible light wavelengths.

In the above constitutions, further, it is desired to use an undrawn film as the first retardation plate.

That is, to suppress the reflection by the interface to the air layer, the light going out from the second retardation plate must be circularly polarized. With the constitution in which the first retardation plate is disposed between the second retardation plate and the reflection-type liquid crystal display panel 1, however, the light is deviated from the circular polarization.

To increase the contrast by decreasing the deviation, it is desired to decrease the in-plane retardation of the first retardation plate as small as possible to bring the in-plane retardation of the second retardation plate close to one-fourth the region of the visible light wavelengths. For this purpose, the undrawn film is used as the first retardation plate so that the in-plane retardation becomes about several nanometers, and the in-plane retardation of the second retardation plate is brought close to ¼ the region of the visible light wavelengths. Then, the light going out from the second retardation plate becomes close to the circularly polarized light, and a large proportion of light reflected by the interface to the air layer is absorbed by the polarizing plate to maintain a high contrast.

In the above constitutions, further, it is desired that a reflection-preventing film is provided on the surface of at least the first retardation plate.

Usually, it is ideal if the reflection-preventing film is formed on the interfaces of both the first retardation plate and the circularly polarizing plate. However, the reflection-preventing film may be formed on the surface of at least the first retardation plate. This decreases the reflection by the interface down to be nearly 0 to ¼, suppressing a decrease in the contrast caused by the total reflection.

Here, priority is given to the surface of the first retardation plate since the surface of the first retardation plate is the interface which totally reflects the light, first. Namely, this efficiently suppresses the total reflection.

In the above constitutions, further, it is desired that the sticking layer provided between the polarizing plate and the light guide plate 2 has a light-diffusing function.

When the display shading such as Newton rings or moiré fringes is produced due chiefly to the light guide late 2, the light-diffusing function is imparted by the above constitution to the interface on the side of the light guide plate 2 to relax the display shading.

Imparting the light-diffusion function is effective in relaxing the display shading, which at the same time, however, causes a decrease in the contrast or causes blurred image. Therefore, the light-diffusing function should be imparted to only a minimum degree that is needed.

In the above constitutions, further, it is desired that the sticking layer provided between the first retardation plate and the reflection-type liquid crystal display panel 1 has a light-diffusing function.

When the display shading is produced due chiefly to the refection-type liquid crystal display panel 1, such as interference fringes with the reflection electrodes of the reflection-type liquid crystal display panel 1, the light-diffusing function is imparted by the above constitution to the interface on the side of the reflection-type liquid crystal display panel 1 to relax the display shading.

In this case, too, imparting the light-diffusion function is effective in relaxing the display shading, which at the same time, however, causes a decrease in the contrast or causes blurred image. Therefore, the light-diffusing function should be imparted to only a minimum degree that is needed.

In the above constitutions, further, it is desired that the opposing surfaces of the first retardation plate and of the second retardation plate are smooth.

There is a method of imparting the light-diffusing function by rendering rugged the interface that comes in contact with the air layer. Upon employing the rugged structure, however, the circularly polarizing plate and the reflection-type liquid crystal display panel 1 are abraded by the external pressure of input by using a pen, and their interfaces are scarred.

By forming smooth surfaces, however, the interfaces are not scarred even when an external pressure is exerted due to input by using a pen.

In the above constitutions, further, it is desired that a viewing angle control plate is disposed between the light guide plate 2 and the reflection-type liquid crystal display panel 1 to diffuse the light incident from a particular direction.

The display shading is chiefly caused by a diffraction phenomenon due to the neighboring light. For example, the diffraction is seen from a given direction despite the prism shape of the light guide plate 2 is optimized so that the diffraction will not been seen from the direction of front surface.

The diffraction phenomenon occurs in a direction in which the phases of neighboring light are in match, i.e., in a direction in which the intervals become integer numbers of times of the wavelength. Therefore, even if the prism pitch is so designed that the phase of light is deviated relative to the front surface, the diffraction phenomenon occurs in a direction in which the light phases are in match.

In this case, the diffraction phenomenon can be relaxed by using the sticking agent having a light-diffusing function resulting, however, in a trade-off with a decrease in the contrast and blurred image due to multiple diffusion. Therefore, the light-diffusing function must be controlled.

By using the viewing angle control plate that diffuses the light incident from a particular direction as in this constitution, however, it is allowed to impart the light-diffusing function in only a particular direction in which the diffraction phenomenon appears conspicuously. There is no light-diffusing function in the direction of the viewer which is the front surface, suppressing a decrease in the contrast and suppressing the blurring of image.

BRIEF DESCRIPTION OF THE DRAWINGS

FIGS. 9A and 9B are views illustrating the reflection-type liquid crystal display device according to an eighth embodiment of the invention;

FIGS. 11A and 11B are views illustrating the reflection-type liquid crystal display device according to a tenth embodiment of the invention;

FIGS. 18A, 18B and 18C are views illustrating arrangement structures of the circularly polarizing plates; and FIG. 19 is a diagram illustrating the light components reflected by the interfaces to the air layer.

DESCRIPTION OF THE PREFERRED EMBODIMENTS

A reflection-type liquid crystal display device according to a first embodiment of the invention will now be described with reference to FIG. 2.

Figure 1:
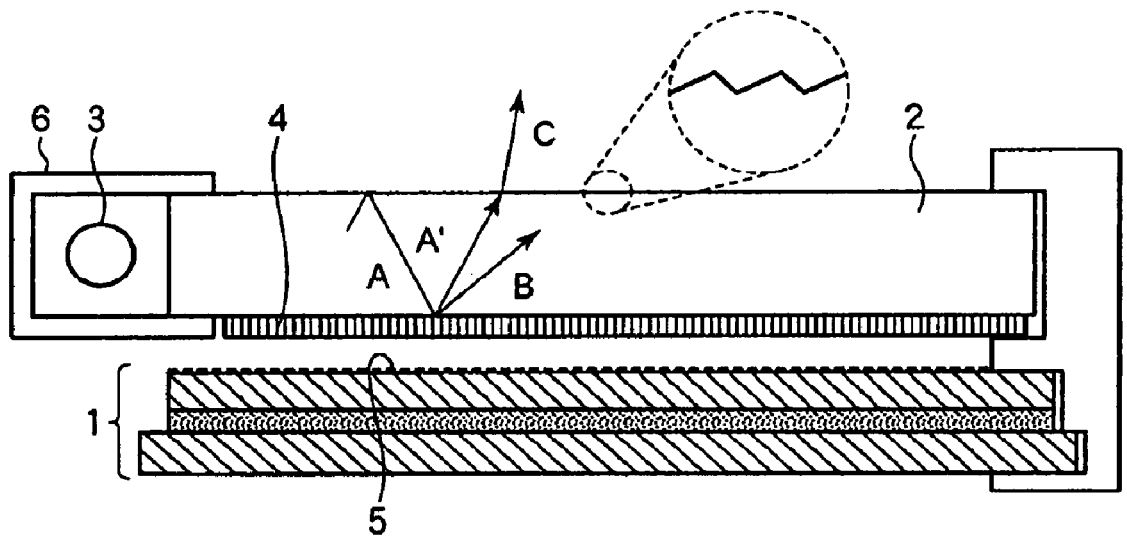
FIG. 1 is a view of constitution illustrating a principle of the invention.
Figure 2:
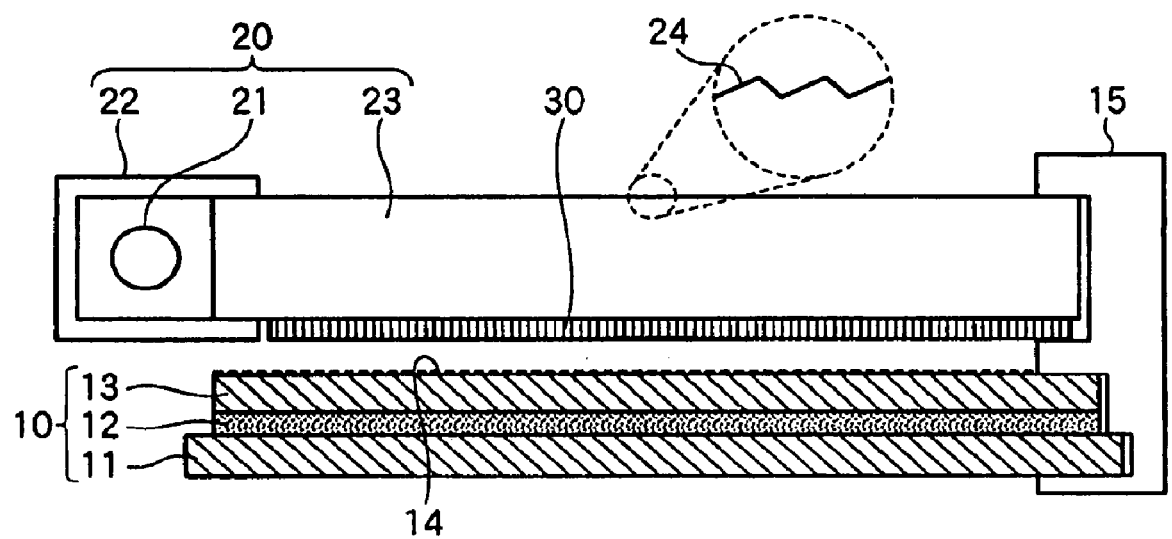
FIG. 2 is a sectional view schematically illustrating a reflection-type liquid crystal display device according to a first embodiment of the invention.

FIG. 2 is a sectional view schematically illustrating the reflection-type liquid crystal display device according to the first embodiment of the present invention, which comprises a front light unit 20, and a liquid crystal display panel 10 constituted by a liquid crystal layer 12 held between a TFT substrate 11 having an alignment film provided on a glass substrate via a reflection electrode and a CF substrate 13 having an alignment film provided on a glass substrate via a transparent electrode. The front light unit 20 and the liquid crystal display panel 10 are firmly held by a frame 15 being opposed to each other maintaining a small gap of not larger than, for example, 1 mm.

The front light unit 20 includes a source 21 of light constituted by a cold cathode tube containing Ar or Ne gas and a trace amount of Hg, a reflector 22 for reflecting and collecting the light from the source 21 of light toward a light guide plate (manufactured by Fujitsu Kasei Co.) 23, and a light guide plate 23. A polarizing element 30 is stuck to the back surface of the light guide plate 23 which is on the side of the liquid crystal display panel by using a sticking agent.

A prism 24 is engraved in the surface of the light guide plate 23 which is on the side of the viewer to reflect part of the light which guided toward the liquid crystal display panel 10.

In this case, the pitch of the prism 24 is so set relative to the pixel pitch of the liquid crystal display panel 10 that the moiré fringes are seen little.

Further, the surface of the liquid crystal display panel 10 is blasted with sand to constitute a rough surface 14 with fine scars having a depth between the vertex and the valley of ruggedness of not larger than 100 μm.

The degree of scars may be of such a level that generate interference rainbow or moiré fringes of a tolerable level. For example, the haze H (cloudiness value) may be about 50% or smaller. If the haze is too large, the brightness and contrast decrease, and the display is blurred, too.

The haze (cloudiness value) H is an index represented by a ratio of a diffusion transmission factor $T_d$ [%] and a total light ray transmission factor $T_t$ [%] that are measured by using an integrating ball-type light ray transmission factor-measuring apparatus, and is given by, and is indicated down to the first decimal place.

$$H [\%] = (T_d/T_t) \times 100$$

When the polarizing element 30 is provided on the side of the light guide plate 23 to enhance the contrast according to the first embodiment of the invention, the light incident upon the liquid crystal display panel 10 generates interference rainbow due to the interference of the reflection surface in the liquid crystal display panel 10 with the pixel portion. However, the interference rainbow is diffused by the rough surface 14 formed on the surface of the liquid crystal display panel 10 and enters in decreased amounts into the viewer's eyes.

Next, the reflection-type liquid crystal display device according to a second embodiment of the present invention will be described with reference to FIG. 3.

Figure 3:
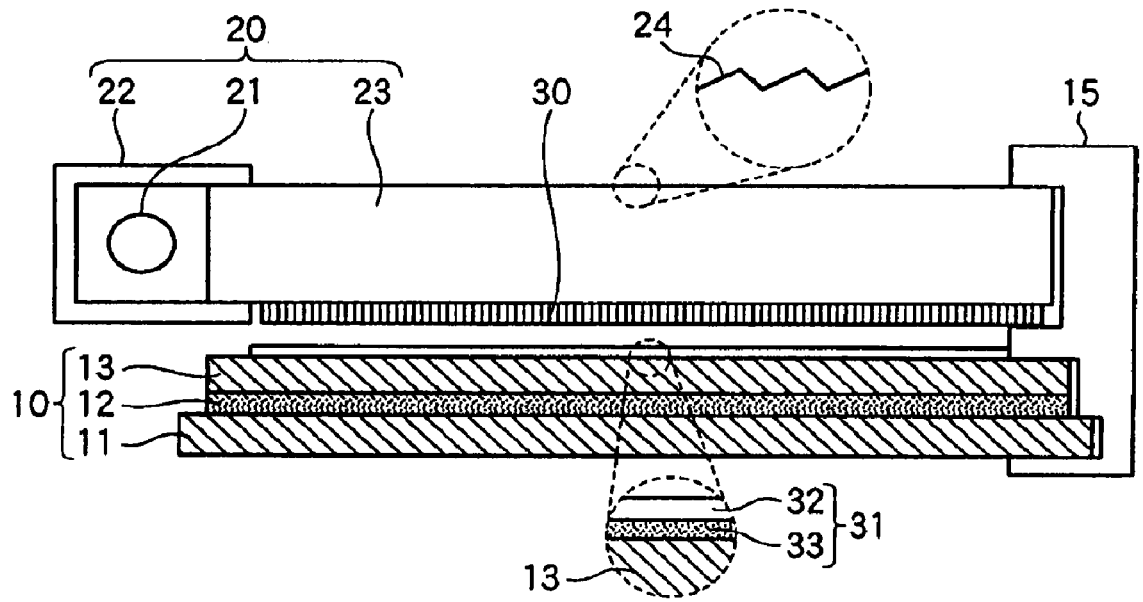
FIG. 3 is a sectional view schematically illustrating the reflection-type liquid crystal display device according to a second embodiment of the invention.

FIG. 3 is a sectional view schematically illustrating the reflection-type liquid crystal display device according to the second embodiment of the invention. The basic constitution is the same as that of the reflection-type liquid crystal display device of the above first embodiment. In the second embodiment, however, the surface of the liquid crystal display panel 10 is not roughened as designated at rough surface 14 but is, instead, provided with a light-diffusing film 31 which comprises a TAC film 32 and a sticking layer 33 containing a light-diffusing material.

The light-diffusing material, in this case, may be, for example, $TiO_x$ and its amount can be determined to maintain a balance in the effects for decreasing the blurring amount of image, moiré fringes and interference rainbow, and may be such that $H \leq 50[\%]$.

In this case, too, the interference rainbow is diffused by the light-diffusing film 31 provided on the surface of the liquid crystal display panel 10, and enters in decreased amounts into the viewer's eyes.

Next, the reflection-type liquid crystal display device according to a third embodiment of the present invention will be described with reference to FIG. 4.

Figure 4:
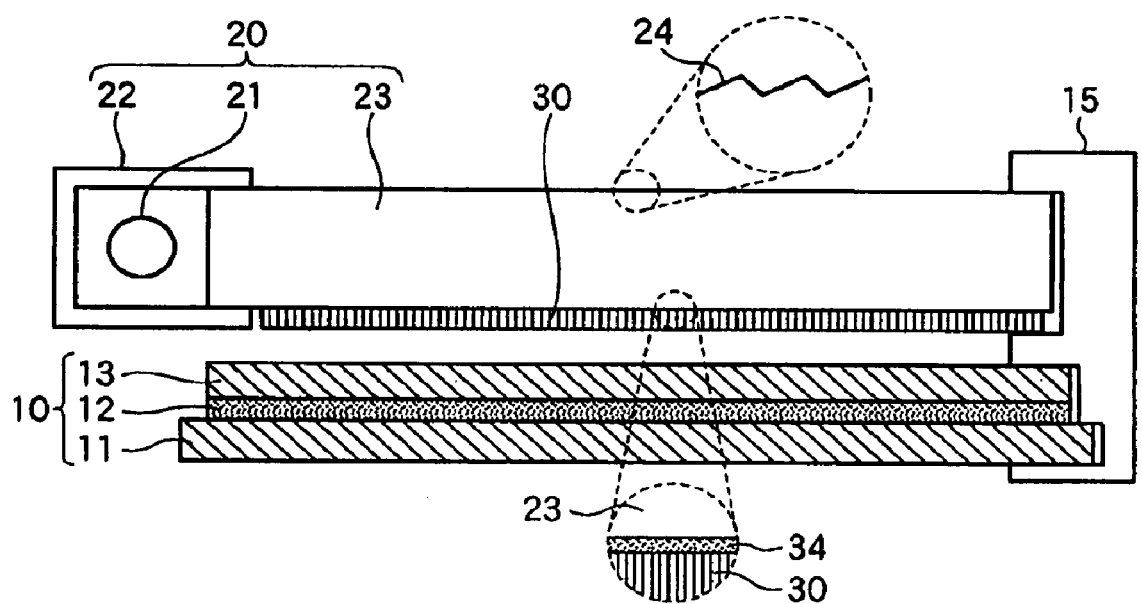
FIG. 4 is a sectional view schematically illustrating the reflection-type liquid crystal display device according to a third embodiment of the invention.

FIG. 4 is a sectional view schematically illustrating the reflection-type liquid crystal display device according to the third embodiment of the invention. The basic constitution is the same as that of the reflection-type liquid crystal display device of the above first embodiment. In the third embodiment, however, the surface of the liquid crystal display panel 10 is not roughened as designated at rough surface 14 and, besides, the polarizing element 30 is stuck to the light guide plate 23 by using a sticking layer 34 containing a light-diffusing material.

In the third embodiment, the light directed by the prism 24 toward the side of the liquid crystal display panel is diffused by the sticking layer 34 containing the light-diffusing material provided on the back surface of the light guide plate 23, and is converted in a direction in which the distribution of light is uniformed, and the moiré intensity is weakened.

Next, the reflection-type liquid crystal display device according to a fourth embodiment of the present invention will be described with reference to FIG. 5.

Figure 5:
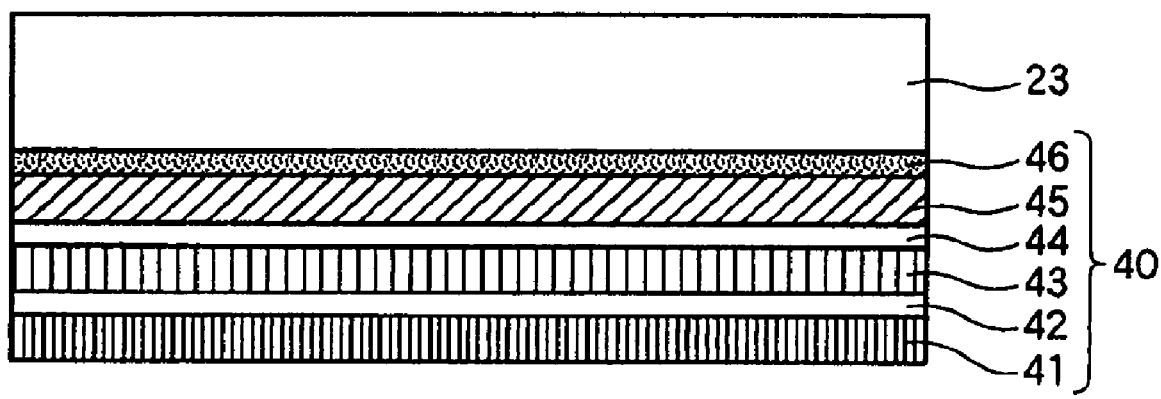
FIG. 5 is a sectional view schematically illustrating a major portion of the reflection-type liquid crystal display device according to a fourth embodiment of the invention.

FIG. 5 is a sectional view schematically illustrating a major portion of the reflection-type liquid crystal display device according to the fourth embodiment of the invention. The basic constitution is the same as that of the third embodiment. Therefore, described below is the constitution of the polarizing element only which makes a difference.

The polarizing element 40 of this case is a polarizing plate constituted by a plurality of pieces of retardation films, i.e., constituted by a λ/4 plate 41, a sticking layer 42, a λ/2 plate 43, a sticking layer 44, a TAC/PVA/TAC film 45 and a sticking layer 46 containing a light-diffusing material, which are stuck to the light guide plate 23 by the sticking layer 46 containing the light-diffusing material.

In the fourth embodiment, the light-diffusing material is contained in the sticking layer closest to the light guide plate 23. The light emitted going out from the light guide plate 23 toward the liquid crystal display panel 10 is reflected by the interface due to a difference in the refractive index between the light guide plate 23 and the polarizing element 40, and becomes a cause of moiré fringes. By containing the light-diffusing material in the sticking layer of the side close to the light guide plate 23, however, the light reflected by the interface is diffused at a place where the reflection takes place first on the interface, and the moiré intensity is effectively weakened.

Next, the reflection-type liquid crystal display device according to a fifth embodiment of the present invention will be described with reference to FIG. 6.

Figure 6:
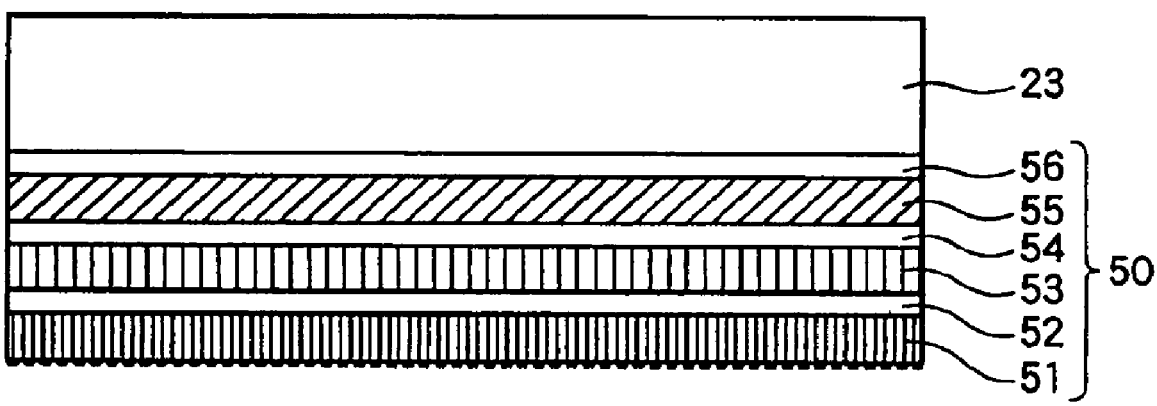
FIG. 6 is a sectional view schematically illustrating a major portion of the reflection-type liquid crystal display device according to a fifth embodiment of the invention.

FIG. 6 is a sectional view schematically illustrating a major portion of the reflection-type liquid crystal display device according to the fifth embodiment of the invention. The basic constitution is the same as that of the third embodiment. Therefore, described below is the constitution of the polarizing element only which makes a difference.

The polarizing element 50 of this case, too, is a polarizing plate constituted by a plurality of pieces of retardation films, i.e., constituted by a λ/4 plate 51 of which the surface is roughened (AG-treated: anti-glare-treated), a sticking layer 52, a λ/2 plate 53, a sticking layer 54, a TAC/PVA/TAC film 55 and a sticking layer 56, which are stuck to the light guide plate 23 by the sticking layer 56.

The constitution of the fifth embodiment is suited in a case where the light reflected by the interface on the side close to the light guide plate 23 is relatively weak, and the light reflected by the interface of the polarizing element 50 relative to the air layer is large.

Next, the reflection-type liquid crystal display device according to a sixth embodiment of the present invention will be described with reference to FIG. 7.

Figure 7:
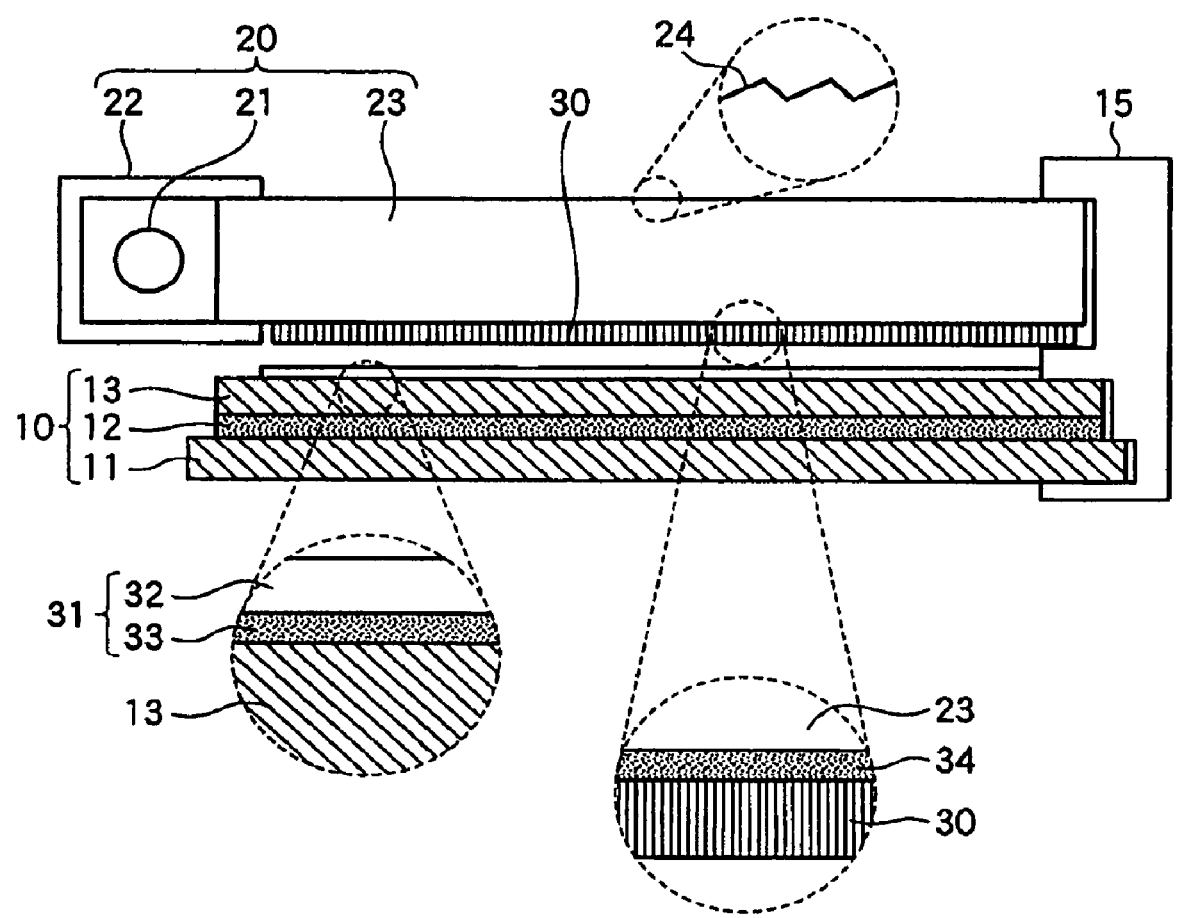
FIG. 7 is a sectional view schematically illustrating the reflection-type liquid crystal display device according to a sixth embodiment of the invention.

FIG. 7 is a sectional view schematically illustrating the reflection-type liquid crystal display device according to the sixth embodiment of the invention. The basic constitution is the same as that of the third embodiment. In the sixth embodiment, however, the light-diffusing film 31 comprising the TAC film 32 and the sticking layer 33 containing the light-diffusing material is provided on the surface of the liquid crystal display panel 10, too, like in the above second embodiment.

In the sixth embodiment, the moiré fringes of the light guide plate 23 itself are decreased by the diffusing action of the sticking layer 34 containing the light-diffusing material on the side of the polarizing element 30 while the interference rainbow is effectively decreased by the diffusing action of the sticking layer 33 containing the light-diffusing material on the side of the liquid crystal display panel 10.

The moiré fringes of the light guide plate 23 and of the liquid crystal display panel 10, too, can be decreased by the diffusing action of the two.

In this case, the degree of diffusion or haze (cloudiness value) of the sticking layer 34 containing the light-diffusing material on the side of the light guide plate 23 may be smaller than the degree of diffusion of the third to the fifth embodiments that use the above single sticking layer 34 containing the light-diffusing material.

Next, the reflection-type liquid crystal display device according to a seventh embodiment of the present invention will be described with reference to FIGS. 8A and 8B. Described below are, however, the constitutions of the polarizing element and the light-diffusing films only.

Figure 8A:
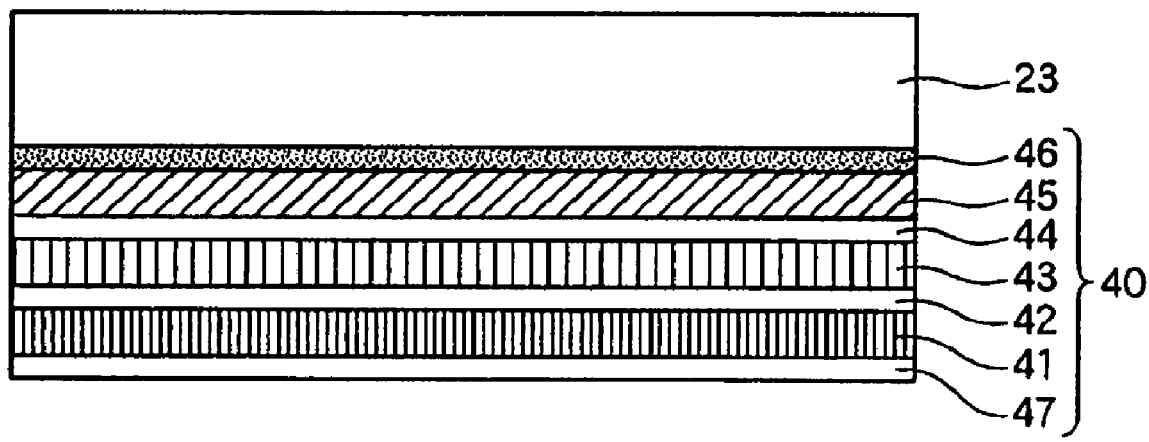
FIGS. 8A and 8B are views illustrating the reflection-type liquid crystal display device according to a seventh embodiment of the invention.

FIG. 8A is a view illustrating a modified example of the polarizing element 40 constituted by a λ/4 plate 41, a sticking layer 42, a λ/2 plate 43, a sticking layer 44, a TAC/PVA/TAC film 45 and a sticking layer 46 containing a light-diffusing material, and, further, having a reflection-preventing film 47 provided on the surface of the λ/4 plate 41 on the surface of the polarizing element 40.

The reflection-preventing film 47 works to suppress the reflection on the interface to the air layer on the side of the light guide plate 23, and decreases the moiré fringes and improves the contrast.

Namely, light emitted to the liquid crystal display panel 10 from the light guide plate 23 is reflected by the surface of the liquid crystal display panel 10. In the case of the black display, the reflected light is absorbed by the polarizing element 40 to produce a black display.

However, the light that is reflected by the interface of the polarizing element 40 to the air layer does not travel toward the liquid crystal display panel 10 but travels toward the viewer. This light is viewed being added up to the light of the black display and, hence, black is seen floating. However, provision of the reflection-preventing film 47 lowers the reflection by the interface, and a high contrast is maintained.

Figure 8B:
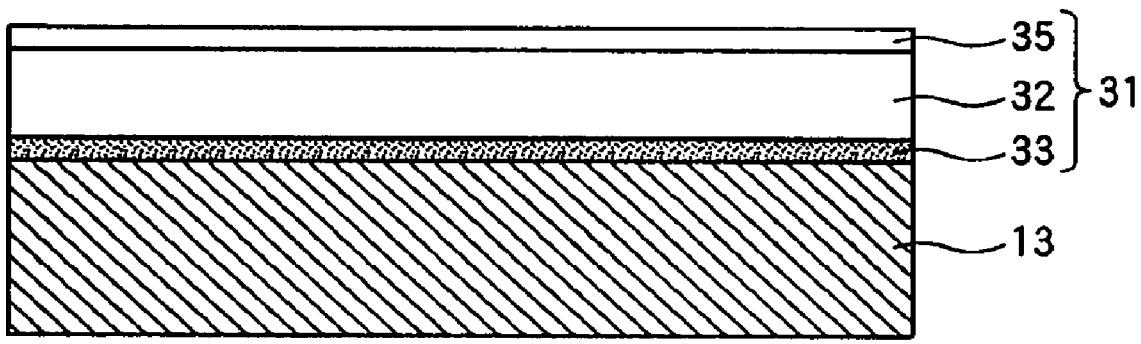

FIG. 8B is a view illustrating a modified example of the light-diffusing film 31 having a reflection-preventing film 35 provided on the surface of the light-diffusing film 31 which is constituted by the TAC film 32 and the sticking layer 33 containing the light-diffusing material.

In this case, too, the reflection-preventing film 35 suppresses the reflection by the interface to the air layer on the side of the liquid crystal display panel 10, decreasing the moiré fringes and enhancing the contrast.

Next, described below with reference to FIGS. 9A and 9B is the reflection-type liquid crystal display device according to an eighth embodiment of the invention. The basic constitution is the same as that of the above first embodiment. Therefore, described below chiefly is the constitution of the polarizing element.

FIG. 9A is a view schematically illustrating the constitution of the reflection-type liquid crystal display device according to the eighth embodiment of the invention. A first retardation plate 61 is stuck onto the liquid crystal display panel 10 by using a sticking material 62 containing the light-diffusing material, and a reflection-preventing film 63 is provided on the first retardation plate 61.

On the other hand, a polarizing plate 66 to which a second retardation plate 64 is stuck with the sticking layer 65, is stuck to the light guide plate 23 through the sticking layer 67 containing the light-diffusing material, and the two are opposed to each other via an air layer 68.

In this case, a circular polarizer 69 is constituted by the first retardation plate 61, second retardation plate 64 and polarizing plate 66.

When the first retardation plate 61 has a retardation A, the retardation of the second retardation plate 64 is set to be λ/4 plate ±A, so that they as a whole work as a λ/4 plate.

Or, the first retardation plate 61 may be the λ/4 plate and the second retardation plate 64 may be the λ/2 plate, so that they as a whole work as a wide-band λ/4 plate.

In the eighth embodiment, the first retardation plate 61 is stuck to the liquid crystal display panel 10 to prevent the reflection, to prevent the scars and to impart the diffusing function. Further, the second retardation plate 64 and the polarizing plate 66 are stuck to the light guide plate 23 to bring the light going out from the second retardation plate 64 close to the circularly polarized light, enabling a large proportion of light reflected by the interface to the air layer to be absorbed by the polarizing plate 66 thereby to enhance the contrast.

Or, the whole plates are rendered to work as a wide-band λ/4 plate to decrease the wavelength dispersion in the in-plane retardation, enabling the light reflected by the liquid crystal display panel 10 to be efficiently absorbed by the polarizing plate 66.

Figures 10A, 10B:
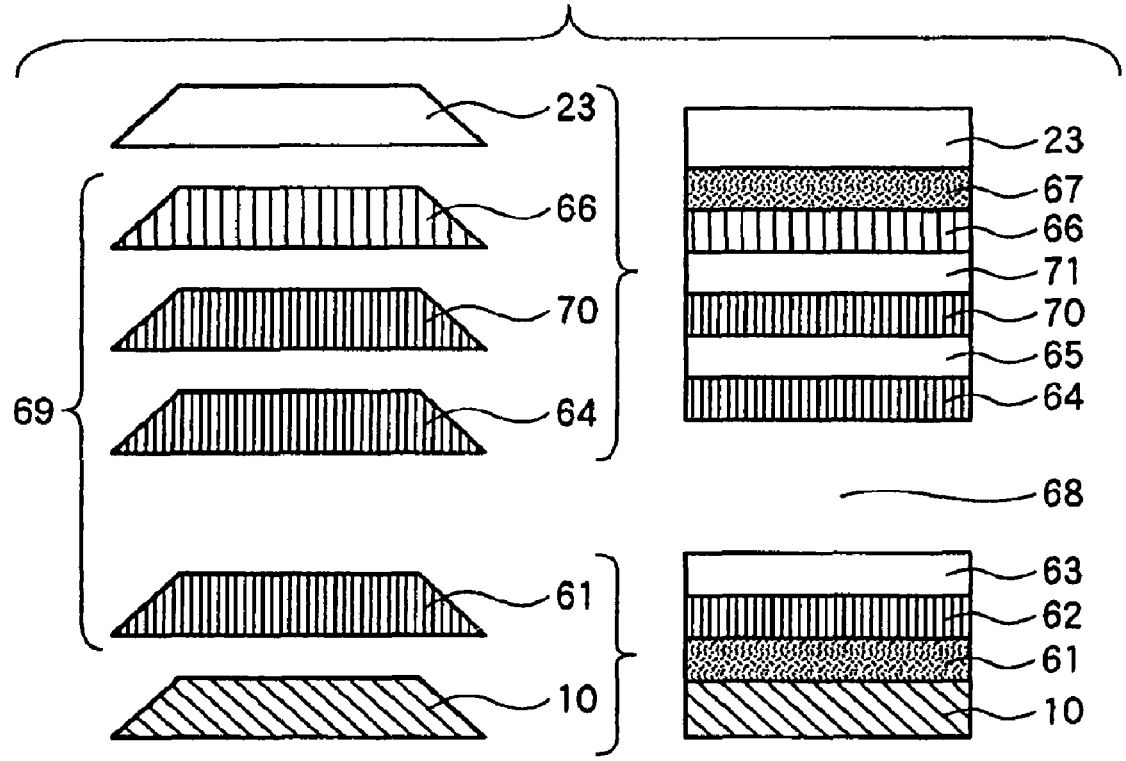
FIGS. 10A and 10B are views illustrating the reflection-type liquid crystal display device according to a ninth embodiment of the invention.

Next, described below with reference to FIGS. 10A and 10B is the reflection-type liquid crystal display device according to a ninth embodiment of the invention. The basic constitution is the same as that of the above eighth embodiment. In this case, a third retardation plate is inserted between the second retardation plate and the polarizing plate.

FIG. 10A is a view schematically illustrating the constitution of the reflection-type liquid crystal display device according to the ninth embodiment of the invention. Like in the above eighth embodiment, the first retardation plate 61 is stuck onto the liquid crystal display panel 10 by using the sticking material 62 containing the light-diffusing material, and the reflection-preventing film 63 is provided on the first retardation plate 61.

On the other hand, a third retardation plate 70 is stuck between the second retardation plate 64 and the polarizing plate 66 by using the sticking layer 65 and the sticking layer 71, which are, then, stuck to the light guide plate 23 with the sticking layer 67 containing the light-diffusing material, and the two are opposed to each other via the air layer 68.

In this case, the circular polarizer 69 is constituted by the first retardation plate 61, the second retardation plate 64, the third retardation plate 70 and the polarizing plate 66.

When the first retardation plate 61 has a retardation A, the retardation of the second retardation plate 64 is set to be λ/4 plate ±A, and the third retardation plate 70 is a λ/2 plate so that they as a whole work as a wide-band λ/4 plate.

Or, the first retardation plate 61 is the λ/4 plate, the second retardation plate 64 is the λ/2 plate and the third retardation plate 70 is the λ/2 plate so that they as a whole work as a wide-band λ/4 plate and as an optical compensation plate.

In the ninth embodiment, the wavelength dispersion in the in-plane retardation is decreased so that the light reflected by the reflection-type liquid crystal display panel 1 is efficiently absorbed by the polarizing plate.

Prevention of reflection, prevention of scars, diffusing function and the action of bringing the light going out from the second retardation plate 64 close to the circularly polarized light, are the same as those of the eighth embodiment described above.

Next, described below with reference to FIGS. 11A and 11B is the reflection-type liquid crystal display device according to a tenth embodiment of the invention. The basic constitution is the same as that of the above eighth embodiment. In this case, the third retardation plate and a fourth retardation plate are inserted between the second retardation plate and the polarizing plate.

FIG. 11A is a view schematically illustrating the constitution of the reflection-type liquid crystal display device according to the tenth embodiment of the invention. Like in the above eighth embodiment, the first retardation plate 61 is stuck onto the liquid crystal display panel 10 by using the sticking material 62 containing the light-diffusing material, and the reflection-preventing film 63 is provided on the first retardation plate 61.

On the other hand, the third retardation plate 70 and the fourth retardation plate 72 are stuck between the second retardation plate 64 and the polarizing plate 66 by using the sticking layer 65, the sticking layer 71 and a sticking layer 73, which are, then, stuck to the light guide plate 23 with the sticking layer 67 containing the light-diffusing material, and the two are opposed to each other via the air layer 68.

In this case, the circular polarizer 69 is constituted by the first retardation plate 61, the second retardation plate 64, the third retardation plate 70, the fourth retardation plate 72 and the polarizing plate 66.

The tenth embodiment will now be described in detail concerning its constitution inclusive of delay phase axes and the effect.

In this case, first, the first retardation plate 61 is made of an undrawn TAC film having an in-plane retardation of several nanometers, e.g., 5.5 nm, the surface of the TAC film being subjected to the hard-coat low-reflection (HCLR) treatment to form a smooth reflection-preventing film 63.

The second retardation plate 64, on the other hand, has an in-plane retardation of 132 to 143 nm so as to approach λ/4, and the angle subtended by the delay phase axis of the first retardation plate 61 and by the delay phase axis of the second retardation plate 64 is selected to be 0 degree to 180 degrees.

The in-plane retardations of the third retardation plate 70 and of the fourth retardation plate 72 are 275 nm, respectively. The angle θ subtended by the absorption axis of the polarizing plate 66 and by the delay phase axis of the fourth retardation plate 72 is selected to be 10 degrees, the angle subtended by the delay phase axis of the fourth retardation plate 72 and by the delay phase axis of the third retardation plate 70 is selected to be 55 degrees, and the angle subtended by the delay phase axis of the third retardation plate 70 and by the delay phase axis of the second retardation plate 64 is selected to be 90 degrees.

Therefore, the angle subtended by the absorption axis of the polarizing plate 66 and by the delay phase axis of the third retardation plate 70 is 65 degrees, i.e., 2θ+45 degrees.

FIGS. 12A to 14B illustrate the results of measuring the reflection intensity and the contrast at a pole angle of 45 degrees of the reflection-type liquid crystal display devices.

The reflection intensities shown in the drawings are those of the black display based on a standard white plate, while the contrasts represent the ratio of reflection intensities of black and white displays.

Here, as for the retardation in the direction of thickness, $\Delta R_{th}$=0 nm represents a case where the absolute value of the retardation $\Delta R_{thLC}$ of the liquid crystal layer is in agreement with the absolute value of the retardation $\Delta R_{thF}$ of the retardation plate, $\Delta R_{th}$=−50 nm represents a case where the retardation $\Delta R_{thLC}$ of the liquid crystal layer is smaller by 50 nm than the retardation $\Delta R_{thF}$ of the retardation plate, and $\Delta R_{th}$=50 nm represents a case where the retardation $\Delta R_{thLC}$ of the liquid crystal layer is larger by 50 nm than the retardation $\Delta R_{thF}$ of the retardation plate.

Namely, an ideal optical compensation in the vertical alignment mode is $\Delta R_{th}$=0 nm. When there is a dispersion in the thickness of the liquid crystal layer and in the retardation plate, however, $\Delta R_{th}$ undergoes a change. Therefore, an optimum value is found in a range of $\Delta R_{th}$=±50 nm presuming that the sum of dispersion in the film thickness is about ±10% at the greatest.

Here, the retardation in the direction of thickness is presumed to be 137.5 nm to 275 nm for the liquid crystal layer and 137.5 nm to 275 nm for the retardation plate.

The liquid crystal layer is vertically aligned. Therefore, if the refractive index of the liquid crystal molecules in the direction of major is denoted by $n_e$, the refractive index of the liquid crystal molecules in the direction of minor axis by $n_o$ and the light path of the liquid crystal layer or cell gap by $d_{LC}$, then the retardation $\Delta R_{thLC}$ of the liquid crystal layer is given by, $$\Delta R_{thLC}=(n_e-n_o) \times d_{LC}=\Delta n \times d_{LC}$$

When the reflection electrode has a rugged structure, however, the liquid crystal layer is aligned in a tilted manner, and the light path $d_{LC}$ differs depending upon the light that is incident and the light that is going out. Therefore, the refractive index n and the light path $d_{LC}$ must be corrected.

On the other hand, if the refractive indexes of the retardation plate in the plane directions are denoted by $n_x$ and $n_y$, the refractive index in the direction of thickness by $n_z$ and the light path in the retardation plate or film thickness by $d_F$, then, the retardation $\Delta R_{thF}$ of the retardation plate is given by, $$\Delta R_{thF}=[(n_x+n_y)/2-n_z] \times d_F$$

Figure 12A:
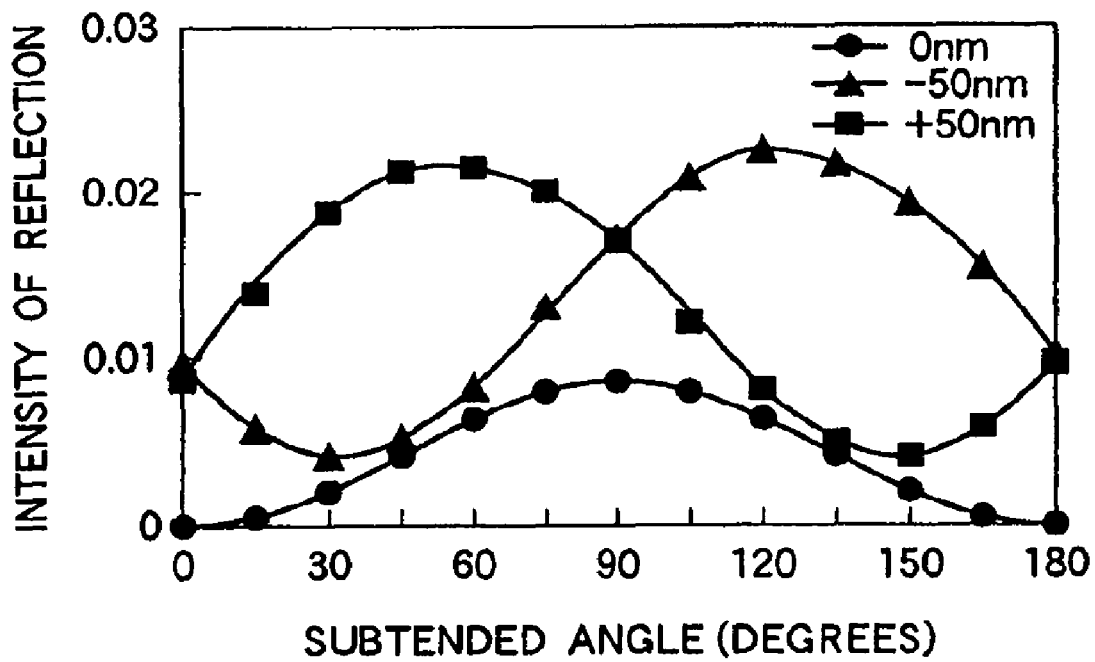
FIGS. 12A and 12B are diagrams illustrating the intensity of reflection and the contrast at a pole angle of 45 degrees of when the in-plane retardation of the second retardation plate is set to be 132 nm in the reflection-type liquid crystal display device according to the tenth embodiment of the invention.
Figure 12B:
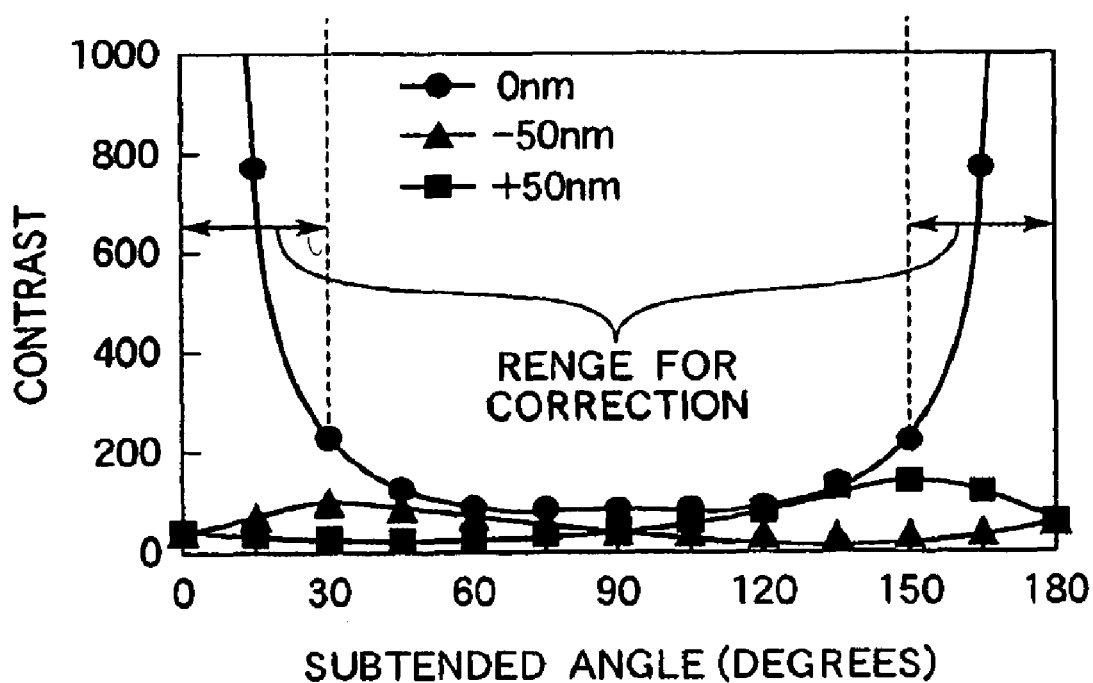

FIGS. 12A and 12B are diagrams illustrating the results of measurement of when the in-plane retardation of the second retardation plate is 132 nm. Here, the visible light wavelength λ is set to be 550 nm which is close to a peak of visual sensitivity, and corresponds to a value obtained by subtracting the in-plane retardation 5.5 nm of the TAC film which is the first retardation plate from 137.5 nm which is the retardation of λ/4.

When $\Delta R_{th}$=0 nm, the angle subtended by the delay phase axis of the first retardation plate and by the delay phase axis of the second retardation plate is 0 degree or 180 degrees, and the reflection intensity of black display is a minimum and the contrast CR is a maximum. When $\Delta R_{th}=\pm 50$ nm, the subtended angle is 30 degrees or 150 degrees, i.e., 0 degrees (180 degrees)±30 degrees, and the reflection intensity of black display is a minimum and CR is a maximum.

This means that when there is no deviation in the retardation in the direction of thickness, the delay phase axes are nearly in parallel and the incident light is circularly polarized. When there is a deviation in the retardation in the direction of thickness, the deviation in the retardation can be corrected by deviating the delay phase axes within a range of roughly 30 degrees from a parallel state.

Figure 13A:
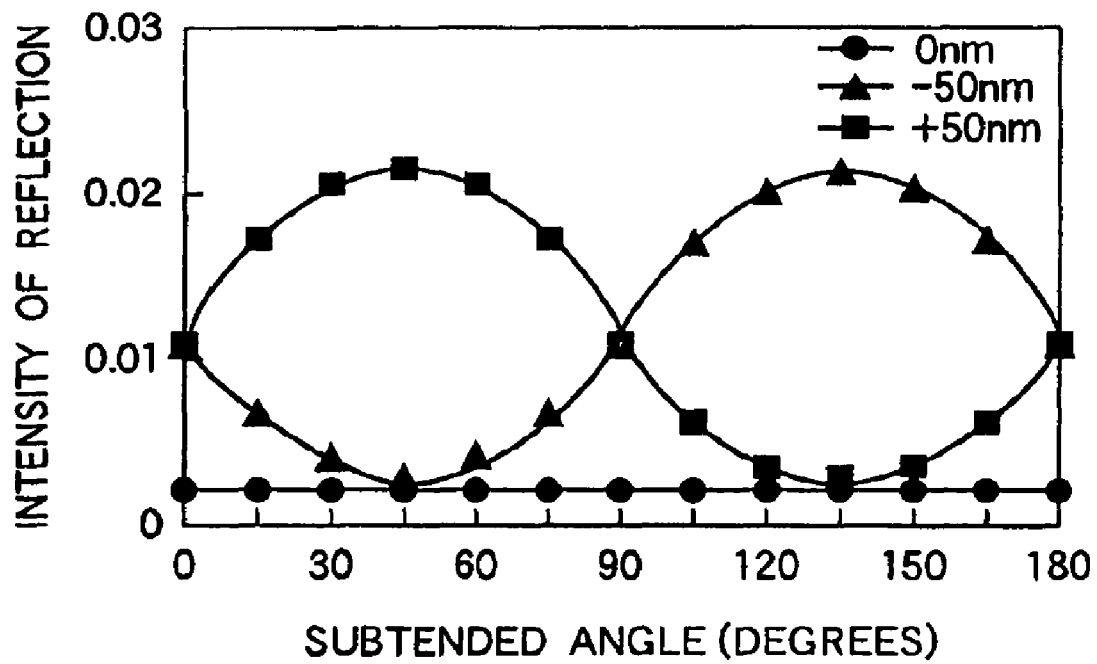
FIGS. 13A and 13B are diagrams illustrating the intensity of reflection and the contrast at a pole angle of 45 degrees of when the in-plane retardation of the second retardation plate is set to be 138 nm in the reflection-type liquid crystal display device according to the tenth embodiment of the invention.
Figure 13B:
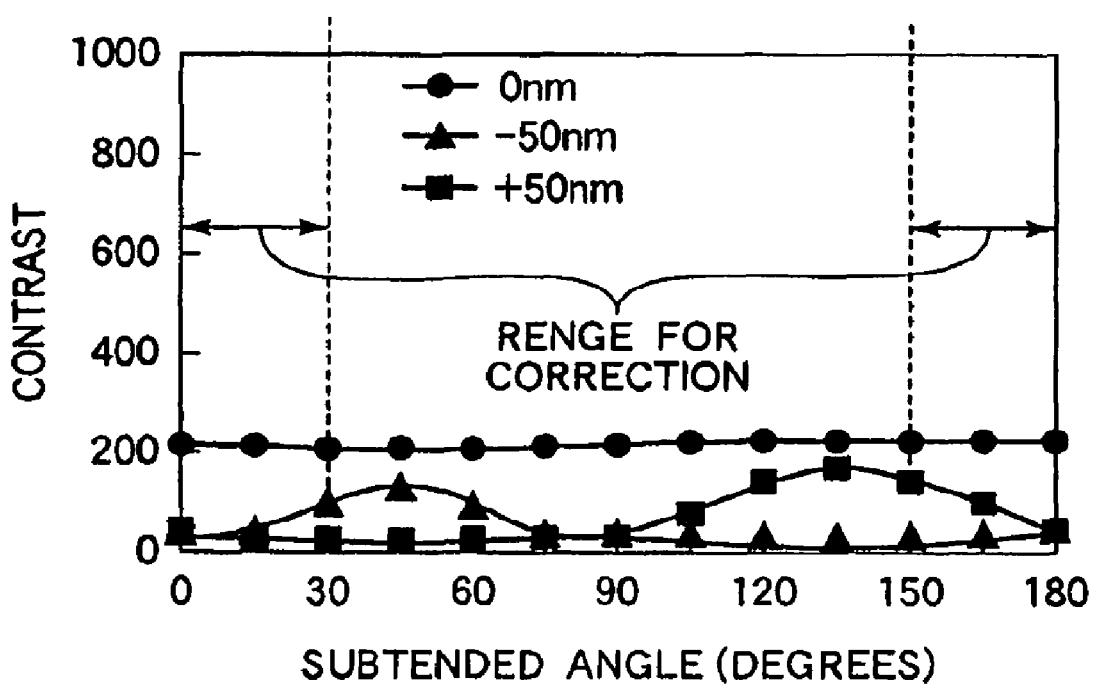

FIGS. 13A and 13B illustrate the results of measurement of when the in-plane retardation of the second retardation plate is 138 nm. In this case, too, the visible light wavelength λ is selected to be 550 nm which is close to a peak of visual sensitivity, and corresponds to 137.5 nm of the retardation of λ/4 without taking into consideration the in-plane retardation of the TAC film which is the first retardation plate.

When $\Delta R_{th}$=0 nm, there is no great difference over the whole angular range. When $\Delta R_{th}=\pm 50$ nm, on the other hand, the reflection intensity of black display becomes a minimum and CR a maximum at a subtended angle of 45 degrees or 135 degrees.

This means that when there is no deviation in the retardation in the direction of thickness, the incident light on the average is deviated from the circularly polarized light in all directions. When there is a deviation in the retardation in the direction of thickness, the deviation in the retardation can be corrected by further deviating the delay phase axes from the parallel state.

Here, however, the retardation conditions for the liquid crystal layer and the retardation plates have been so set that $\Delta R_{th}$=0 nm. Therefore, no advantage is obtained when $\Delta R_{th}$=0 nm but advantage is obtained only when $\Delta R_{th}$ is deviated. A maximum CR obtained by this constitution is 1/10 to 1/20 that of the case of when the in-plane retardation of the second retardation plate shown in FIG. 12 is 132 nm.

Figure 14A:
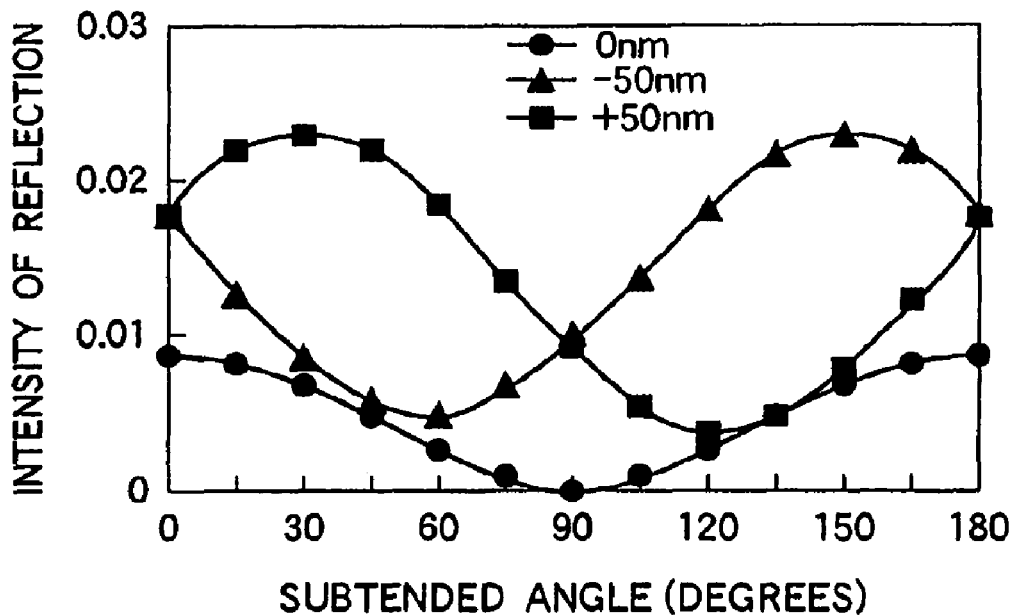
FIGS. 14A and 14B are diagrams illustrating the intensity of reflection and the contrast at a pole angle of 45 degrees of when the in-plane retardation of the second retardation plate is set to be 143 nm in the reflection-type liquid crystal display device according to the tenth embodiment of the invention.
Figure 14B:
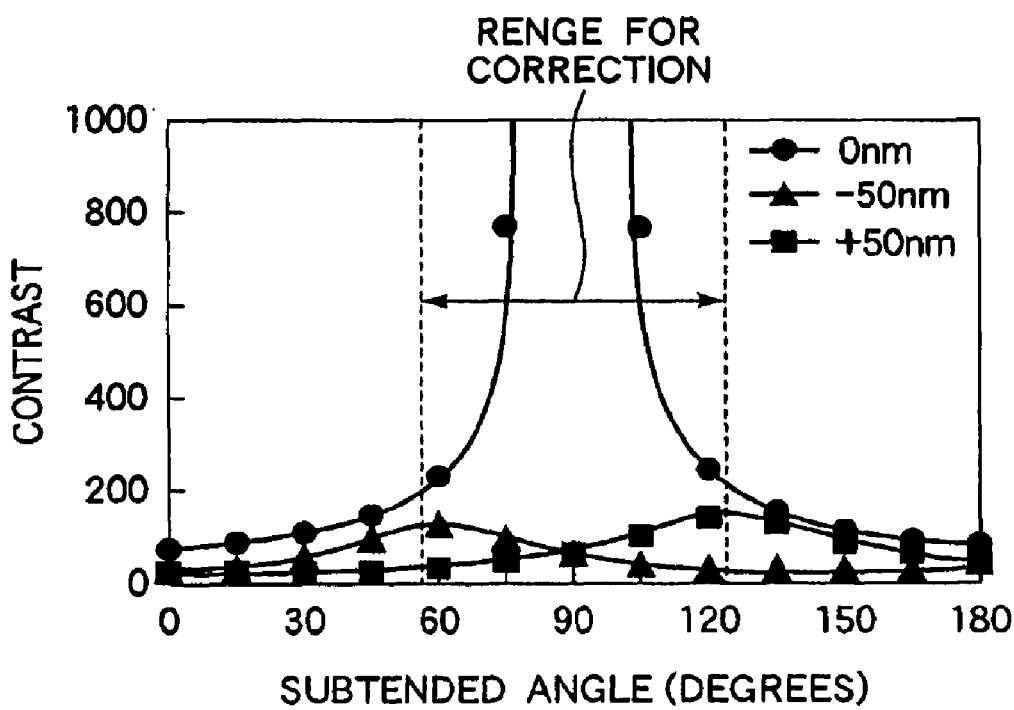

FIGS. 14A and 14B illustrate the results of measurement of when the in-plane retardation of the second retardation plate is 143 nm. In this case, too, the visible light wavelength λ is selected to be 550 nm which is close to a peak if visual sensitivity and which corresponds to a value obtained by adding the in-plane retardation 5.5 nm of the TAC film which is the first retardation plate to 137.5 nm which is the retardation of λ/4.

When $\Delta R_{th}$=0 nm, the reflection intensity of black display is a minimum and the contrast CR is a maximum at an angle of 90 degrees subtended by the delay phase axis of the first retardation plate and by the delay phase axis of the second retardation plate. When $\Delta R_{th}=\pm 50$ nm, on the other hand, the reflection intensity of black display is a minimum and CR is a maximum at a subtended angle of 60 degrees or 120 degrees, i.e., at 90 degrees±30 degrees.

This means that when there is no deviation in the retardation in the direction of thickness, the incident light is circularly polarized when the delay phase angles are at right angles. When there is a deviation in the retardation in the direction of thickness, the deviation in the retardation can be corrected by further deviating the delay phase axes in a range of about 30 degrees from the state where the delay phase axes are intersecting at right angles.

From the results of FIGS. 12A to 14B, it can be comprehended that the contrast CR is greatly improved by constituting the circular polarizer 69 by taking the TAC film that serves as the first retardation plate into consideration, i.e., by constituting the circular polarizer 69 by taking into consideration the in-plane retardations and delay phase axes of the first retardation plate and of the second retardation plate.

Next, described below is the reflection-type liquid crystal display device according to an eleventh embodiment of the invention.

The reflection-type liquid crystal display device of the eleventh embodiment is the one in which the reflection-preventing film 63 is removed from the surface of the first retardation plate 61 of the tenth embodiment.

Here, the in-plane retardation of the second retardation plate 64 is 132 nm, and the angle subtended by the delay phase axes of the first retardation plate 61 and of the second retardation plate 64 is 0 degree. Measurement of the reflection intensity at a pole angle of 45 degrees indicates that the reflection intensity of black display at $\Delta R_{th}$=0 nm is about 4 times as great as that of the tenth embodiment but CR is one-fourth.

This indicates that the interface to the air layer dominates the reflection by the interface, and the contrast can be improved to a considerable degree if the reflection by the interface is suppressed by using the reflection-preventing film.

The reflection-type liquid crystal display device of the eleventh embodiment exhibits inferior characteristics to the liquid crystal display device of the tenth embodiment but features an enhanced contrast compared to that of the prior art.

Next, the reflection-type liquid crystal display device according to a twelfth embodiment of the invention will be described with reference to FIG. 15.

The reflection-type liquid crystal display device according to the twelfth embodiment is the one in which the sticking layer 62 containing the light-diffusing material on the side of the liquid crystal display panel 10 and the sticking layer 67 containing the light-diffusing material on the side of the light guide plate 23 have haze values (cloudiness values) of 20[%] to 60[%] of the reflection-type liquid crystal display device of the tenth embodiment.

Figures 15, 16:
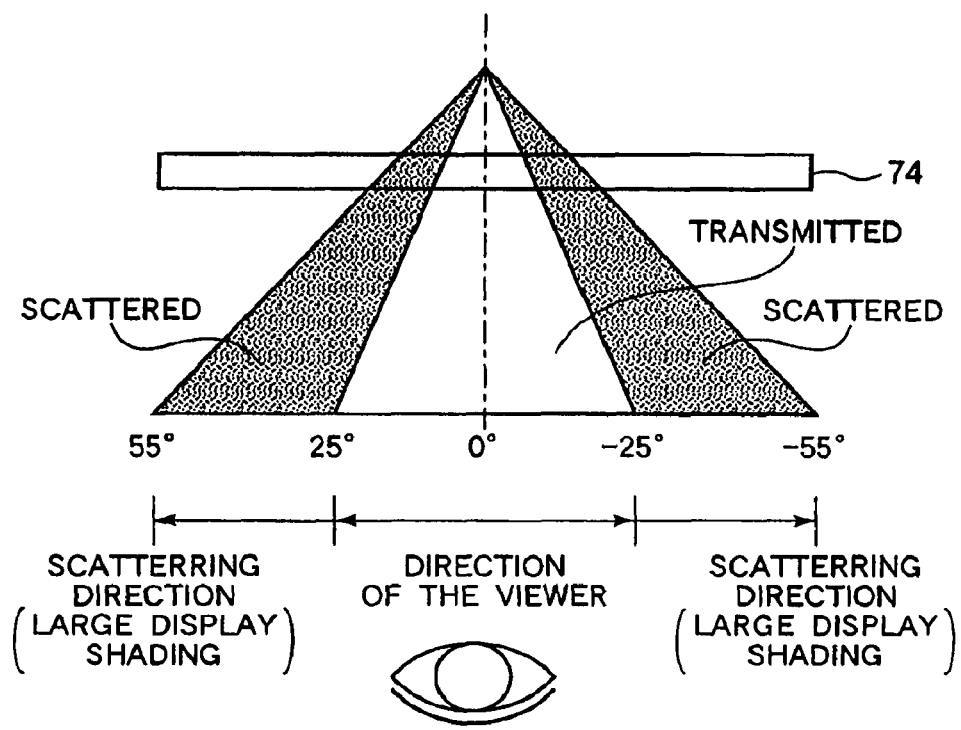
FIG. 15 is a diagram illustrating the Newton rings or moiré interference fringes at various haze values, and the results of improvement in the interference rainbow.
FIG. 16 is a diagram illustrating the diffusion characteristics of a viewing angle control plate.
Figure 17:
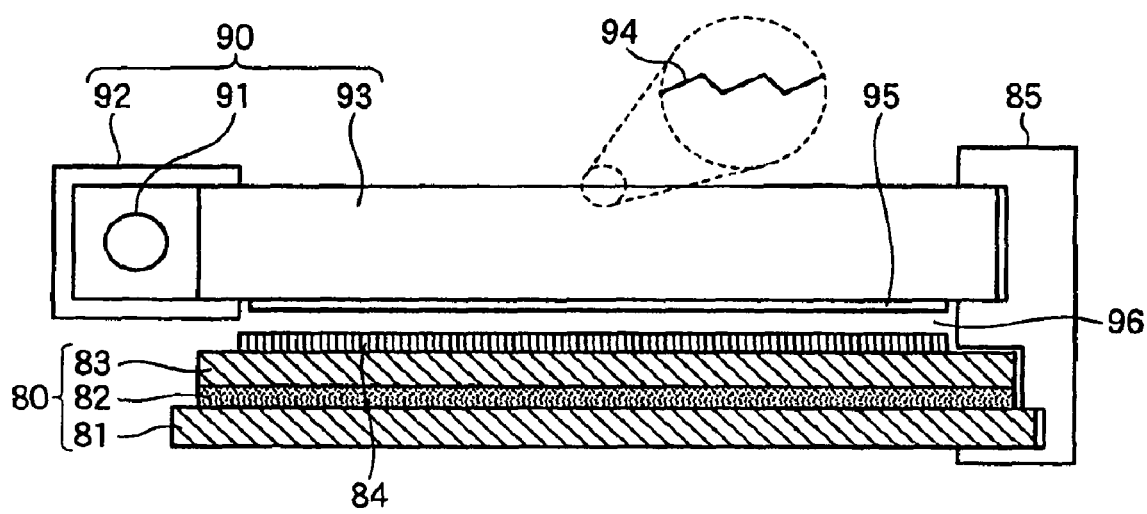
FIG. 17 is a sectional view schematically illustrating a conventional reflection-type liquid crystal display device.

FIG. 15 is a diagram which illustrates the results of improvement in the Newton rings or moiré interference fringes at each of the haze values and the interference rainbow due to the reflection electrode.

For comparison, there are fabricated a reflection-type liquid crystal display device without light-diffusing materials in the respective sticking layers and a reflection-type liquid crystal display device having fine ruggedness formed on the surface of the first retardation plate 61 and subjected to the anti-glare (AG) treatment only.

As will be obvious from the drawing, use of the sticking layer 67 containing the light-diffusing material on the side of the light guide plate 23 decreases the display shading such as Newton rings and moiré fringes caused chiefly by the light guide plate. On the other hand, use of the sticking layer 61 containing the light-diffusing material on the side of the liquid crystal display panel 10 decreases the display shade caused chiefly by the reflection-type liquid crystal display panel, such as interference rainbow due to the reflection electrode.

Here, the light-diffusing function increases with an increase in the haze values enabling the display shading to be further decreased. If the haze value is increased to be not smaller than 60[%], however, the contrast decreases and the image is further blurred.

It is therefore desired that the sticking layer containing the light-diffusing material having such a diffusion degree that the haze value is about 40[%], is used for both or for at least either one of the sticking layer 62 containing the light-diffusing material on the side of the liquid crystal display panel 10 and the sticking layer 67 containing the light-diffusing material on the side of the light guide plate 23.

The display shading is observed in the reflection-type liquid crystal display devices for comparison without the light-diffusing material in the sticking layers.

Decreased interference fringes are exhibited by the reflection-type liquid crystal display devices which have fine ruggedness formed on the surface of the first retardation plate 61 and which are subjected to the anti-glare (AG) treatment. However, scars occur due to the abrasion of the first retardation plate 61 having ruggedness in the surface and the abrasion of the second retardation plate having a flat surface.

Described below next with reference to FIG. 16 is the reflection-type liquid crystal display device according to a thirteenth embodiment of the invention.

The reflection-type liquid crystal display device of the thirteenth embodiment is the same as that of the above tenth embodiment except that a viewing angle control plate 74 such as LUMISTY (trade name, manufactured by Sumitomo Kagaku Co.) for diffusing an incident beam from a particular direction is arranged between the light guide plate 23 and the polarizing plate 66.

FIG. 16 is a diagram illustrating the diffusion characteristics of the viewing angle control plate 74. The viewing angle control plate 74 is so designed as to permit the transmission of light incident within a range of ±25 degrees from the direction perpendicular to the substrate and to diffuse the light incident in a range of ±25 to 55 degrees.

Though the angular range of diffusion can be arbitrarily set, the angle is set within the above range since the occurrence of display shading is conspicuous in the above angular range.

This is because, the display shading is caused by the diffraction phenomenon and the diffraction is seen from a certain direction even if the prism shape is optimized so that the diffraction will not be seen from the direction of front surface.

As a result of observing how the display shading can be seen, it is learned that, though the display is slightly shaded, the contrast is high and the image is not blurred within a range of ±25 degrees from the direction perpendicular to the substrate which is the direction from the viewer. In the range of ±25 to 55 degrees, further, the display shading is not almost seen decreasing the offensive feeling caused by the display shading in the visible range.

Though various embodiments of the invention was described above, it should be noted that the invention is in no way limited to the constitutions of the above embodiments only but can be modified in a variety of ways.

In the first embodiment, for example, the surface of the liquid crystal display panel is scarred by blasting the sand. However, the scars can be formed not only by the sand blasting.

In the above embodiments, further, the polarizing plate and the light guide plate are stuck together, and the retardation plate and the liquid crystal display panel are stuck together, by using sticking layers. However, the polarizing plate and the light guide plate, and the retardation plate and the liquid crystal display panel, may be stuck together not only by using the sticking layers but also by using an adhesive such as a UV-curable adhesive.

Further, though not described in detail, the constitutions of the eighth and the ninth embodiments comply with that of the above tenth embodiment, and the constitutions described in the Section of "Summary of the Invention" can be employed.

According to the invention, as described above, since moiré frigges and the interference rainbow can be decreased, it is possible to improve the quality of display in the reflection-type liquid crystal display device using the front light unit. Therefore, the invention contributes largely toward particularly realizing the reflection-type liquid crystal display device with high quality of display for middle-sized and large-sized display.

What is claimed is:

1. A reflection-type liquid crystal display device comprising:
    a light guide plate having a polarizing element stuck or adhered thereto on the side facing a reflection-type liquid crystal display panel and arranged maintaining a predetermined gap relative to the reflection-type liquid crystal display panel, the polarizing element including one or more optical films;
    a source of light arranged on an end surface side of the light guide plate;
    a light-diffusing member having a light-diffusing function and interposed between at least one of the optical films and the light guide plate.

2. A reflection-type liquid crystal display device according to claim 1, wherein the polarizing element further includes a plurality of sticking layers, and the light-diffusing member is formed from light-diffusing material contained in at least one of the plurality of sticking layers.

3. A reflection-type liquid crystal display device according to claim 2, wherein the light-diffusing member is formed from light-diffusing material contained in a sticking layer of the side close to the light guide plate among the plurality of sticking layers constituting the polarizing element.

4. A reflection-type liquid crystal display device according to claim 3, wherein the light-diffusing member is formed from light-diffusing material contained in a sticking layer that is in contact with the light guide plate among the plurality of sticking layers constituting the polarizing element.

5. A reflection-type liquid crystal display device according to claim 1, wherein the outermost surface of the polarizing element stuck or adhered to the light guide plate is a rough surface.

6. A reflection-type liquid crystal display device according to claim 1, wherein the polarizing element is subjected to a reflection-preventing treatment on a side of the polarizing element closer to the gap.

* * * * *